(12) United States Patent
Hotta et al.

(10) Patent No.: US 7,471,990 B2
(45) Date of Patent: Dec. 30, 2008

(54) DESIGN AND MANUFACTURE AIDING APPARATUS AND METHOD

(75) Inventors: Miyako Hotta, Hitachi (JP); Tomotoshi Ishida, Hitachinaka (JP); Yoshihiro Murakami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 11/488,638

(22) Filed: Jul. 19, 2006

(65) Prior Publication Data
US 2007/0043635 A1 Feb. 22, 2007

(30) Foreign Application Priority Data
Jul. 19, 2005 (JP) ............................... 2005-207965

(51) Int. Cl.
*G06F 19/00* (2006.01)
(52) U.S. Cl. ..................... 700/107; 700/106; 700/96
(58) Field of Classification Search ................. 700/96, 700/106–107; 705/29
See application file for complete search history.

(56) References Cited

U.S. PATENT DOCUMENTS

| | | | | |
|---|---|---|---|---|
| 6,041,268 A | * | 3/2000 | Jin ............................ | 700/107 |
| 6,819,967 B2 | * | 11/2004 | Ballas et al. ................. | 700/107 |
| 7,047,237 B2 | * | 5/2006 | Suzuki et al. .................. | 707/3 |
| 7,127,458 B1 | * | 10/2006 | Mantripragada et al. ....... | 707/6 |
| 7,188,075 B1 | * | 3/2007 | Smirnov ...................... | 705/10 |
| 2003/0110150 A1 | * | 6/2003 | O'Neil et al. .................. | 707/1 |
| 2006/0155407 A1 | * | 7/2006 | Azuma ........................ | 700/105 |
| 2007/0005612 A1 | * | 1/2007 | Goh et al. .................... | 707/100 |

FOREIGN PATENT DOCUMENTS

JP 2002-049649 2/2002

* cited by examiner

*Primary Examiner*—Alexander J Kosowski
(74) *Attorney, Agent, or Firm*—Antonelli, Terry, Stout & Kraus, LLP.

(57) ABSTRACT

The design/manufacture support system has a self company/correspondent parts number correspondence storing unit for storing the correspondence between parts numbers of self company and correspondent parts, a self company parts bill storage unit for storing a structure of parts of a self company product, a correspondent parts bill storage unit for storing a structure of parts purchased from a correspondent, a representative part creation unit for creating a representative part from the correspondence between self company and correspondent parts numbers stored in the self company/correspondent parts number correspondence storing unit, and a parts bill creation unit for creating a parts bill from the representative part created by the representative part creation unit, the self company parts bill stored in the self company parts bill storage unit and the correspondent parts bill stored in the correspondent parts bill storage unit.

23 Claims, 35 Drawing Sheets

FIG. 2

| SELF COMPANY PARTS NUMBER | CORRESPONDENT COMPANY NUMBER | CORRESPONDENT PARTS NUMBER | |
|---|---|---|---|
| CCC | XX | C1 | ~24 |
| DDD | XX | D1 | ~25 |
| DDD | YY | D2 | ~26 |
| EEE | YY | E1 | ~27 |

Columns: 21, 22, 23

FIG. 3

| PARTS NUMBER | PARTS NAME | ATTRIBUTE 1 | ATTRIBUTE 2 | ... | |
|---|---|---|---|---|---|
| AAA | PART A | | | | ~36 |
| BBB | PART B | | | | ~37 |
| CCC | PART C | | | | ~38 |
| DDD | PART D | | | | ~39 |
| EEE | PART E | | | | ~40 |

Columns: 31, 32, 33, 34, 35

| PARENT PARTS | CHILD PARTS | QUANTITY | |
|---|---|---|---|
| AAA | BBB | 1 | 44 |
| AAA | CCC | 1 | 45 |
| BBB | DDD | 1 | 46 |
| BBB | EEE | 1 | 47 |

41 — PARENT PARTS
42 — CHILD PARTS
43 — QUANTITY

FIG. 6

| PARTS NUMBER | PARTS NAME | CORRESPONDENT COMPANY NUMBER | ATTRIBUTE 1 | ATTRIBUTE 2 | ... |
|---|---|---|---|---|---|
| C1 | PART C1 | XX | | | |
| D1 | PART D2 | XX | | | |
| G1 | PART G1 | XX | | | |
| H1 | PART H1 | XX | | | |
| D2 | PART D2 | YY | | | |
| E1 | PART E1 | YY | | | |

61 — 62 — 63 — 64 — 65 — 66

67, 68, 69, 6A, 6B, 6C

| PARENT PARTS COMPANY NUMBER | PARENT PARTS | CHILD PARTS COMPANY NUMBER | CHILD PARTS | QUANTITY |
|---|---|---|---|---|
| XX | C1 | XX | G1 | 1 |
| XX | C1 | XX | H1 | 1 |

FIG.12
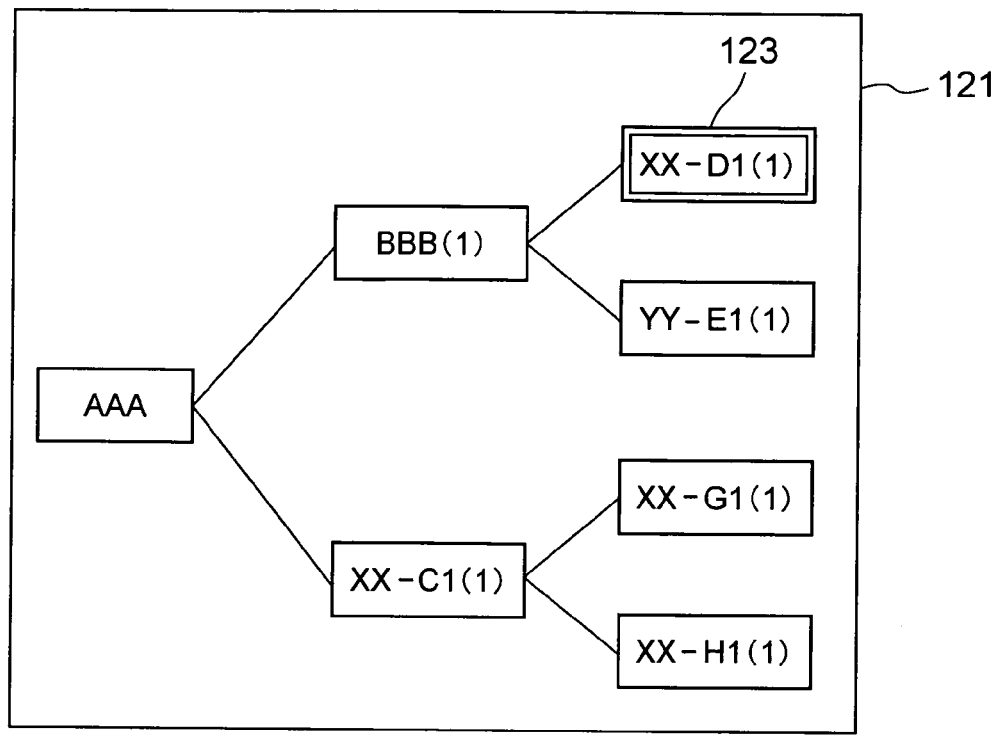
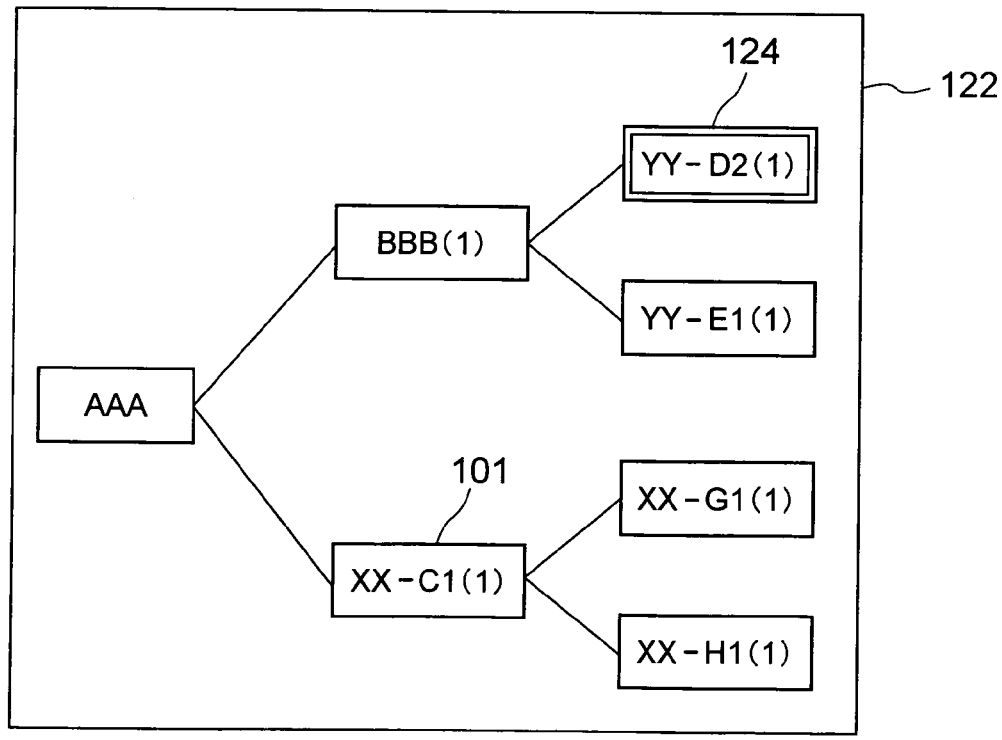

FIG.18

| COMPANY NUMBER | PARTS NUMBER | ATTRIBUTE KIND | CONTENT AMOUNT | |
|---|---|---|---|---|
| XX | D1 | CHEMICAL SUBSTANCE 1 | 5mg | ~185 |
| XX | D1 | CHEMICAL SUBSTANCE 2 | 4mg | ~186 |
| YY | D2 | CHEMICAL SUBSTANCE 1 | 2mg | ~187 |
| YY | D2 | CHEMICAL SUBSTANCE 2 | 7mg | ~188 |
| YY | E1 | CHEMICAL SUBSTANCE 1 | 1mg | ~189 |
| YY | E1 | CHEMICAL SUBSTANCE 2 | 1mg | ~18A |
| XX | G1 | CHEMICAL SUBSTANCE 1 | 1mg | ~18B |
| XX | G1 | CHEMICAL SUBSTANCE 2 | 1mg | ~18C |
| XX | H1 | CHEMICAL SUBSTANCE 1 | 1mg | ~18D |
| XX | H1 | CHEMICAL SUBSTANCE 2 | 1mg | ~18E |

Column labels: 181, 182, 183, 184

FIG.21

| COMPANY NUMBER (211) | PARTS NUMBER (212) | ATTRIBUTE KIND (213) | CONTENT AMOUNT (214) | REPRESENTATIVE PART FLAG (215) | |
|---|---|---|---|---|---|
| XX | D1 | CHEMICAL SUBSTANCE 1 | 5mg | 0 | ~216 |
| XX | D1 | CHEMICAL SUBSTANCE 2 | 4mg | 0 | ~217 |
| YY | D2 | CHEMICAL SUBSTANCE 1 | 2mg | 0 | ~218 |
| YY | D2 | CHEMICAL SUBSTANCE 2 | 7mg | 0 | ~219 |
| YY | E1 | CHEMICAL SUBSTANCE 1 | 1mg | 0 | ~21A |
| YY | E1 | CHEMICAL SUBSTANCE 2 | 1mg | 0 | ~21B |
| XX | G1 | CHEMICAL SUBSTANCE 1 | 1mg | 0 | ~21C |
| XX | G1 | CHEMICAL SUBSTANCE 2 | 1mg | 0 | ~21D |
| XX | H1 | CHEMICAL SUBSTANCE 1 | 1mg | 0 | ~21E |
| XX | H1 | CHEMICAL SUBSTANCE 2 | 1mg | 0 | ~21F |
| XX | C1 | CHEMICAL SUBSTANCE 1 | | 0 | ~21G |
| XX | C1 | CHEMICAL SUBSTANCE 2 | | 0 | ~21H |
| | EEE | CHEMICAL SUBSTANCE 1 | | 1 | ~21 I |
| | EEE | CHEMICAL SUBSTANCE 2 | | 1 | ~21J |
| | DDD | CHEMICAL SUBSTANCE 1 | | 1 | ~21K |
| | DDD | CHEMICAL SUBSTANCE 2 | | 1 | ~21L |
| | CCC | CHEMICAL SUBSTANCE 1 | | 1 | ~21M |
| | CCC | CHEMICAL SUBSTANCE 2 | | 1 | ~21N |
| | BBB | CHEMICAL SUBSTANCE 1 | | 0 | ~21O |
| | BBB | CHEMICAL SUBSTANCE 2 | | 0 | ~21P |
| | AAA | CHEMICAL SUBSTANCE 1 | | 0 | ~21Q |
| | AAA | CHEMICAL SUBSTANCE 2 | | 0 | ~21R |

FIG.23

| COMPANY NUMBER (241) | PARTS NUMBER (242) | ATTRIBUTE KIND (243) | CONTENT AMOUNT (244) | REPRESENTATIVE PART FLAG (245) | |
|---|---|---|---|---|---|
| XX | D1 | CHEMICAL SUBSTANCE 1 | 5mg | 0 | ~246 |
| XX | D1 | CHEMICAL SUBSTANCE 2 | 4mg | 0 | ~247 |
| YY | D2 | CHEMICAL SUBSTANCE 1 | 2mg | 0 | ~248 |
| YY | D2 | CHEMICAL SUBSTANCE 2 | 7mg | 0 | ~249 |
| YY | E1 | CHEMICAL SUBSTANCE 1 | 1mg | 0 | ~24A |
| YY | E1 | CHEMICAL SUBSTANCE 2 | 1mg | 0 | ~24B |
| XX | G1 | CHEMICAL SUBSTANCE 1 | 1mg | 0 | ~24C |
| XX | G1 | CHEMICAL SUBSTANCE 2 | 1mg | 0 | ~24D |
| XX | H1 | CHEMICAL SUBSTANCE 1 | 1mg | 0 | ~24E |
| XX | H1 | CHEMICAL SUBSTANCE 2 | 1mg | 0 | ~24F |
| XX | C1 | CHEMICAL SUBSTANCE 1 | 2mg | 0 | ~24G |
| XX | C1 | CHEMICAL SUBSTANCE 2 | 2mg | 0 | ~24H |
|  | EEE | CHEMICAL SUBSTANCE 1 | 1mg | 1 | ~24I |
|  | EEE | CHEMICAL SUBSTANCE 2 | 1mg | 1 | ~24J |
|  | DDD | CHEMICAL SUBSTANCE 1 | 5mg | 1 | ~24K |
|  | DDD | CHEMICAL SUBSTANCE 2 | 7mg | 1 | ~24L |
|  | CCC | CHEMICAL SUBSTANCE 1 | 2mg | 1 | ~24M |
|  | CCC | CHEMICAL SUBSTANCE 2 | 2mg | 1 | ~24N |
|  | BBB | CHEMICAL SUBSTANCE 1 | 6mg | 0 | ~24O |
|  | BBB | CHEMICAL SUBSTANCE 2 | 8mg | 0 | ~24P |
|  | AAA | CHEMICAL SUBSTANCE 1 | 8mg | 0 | ~24Q |
|  | AAA | CHEMICAL SUBSTANCE 2 | 10mg | 0 | ~24R |

FIG.24
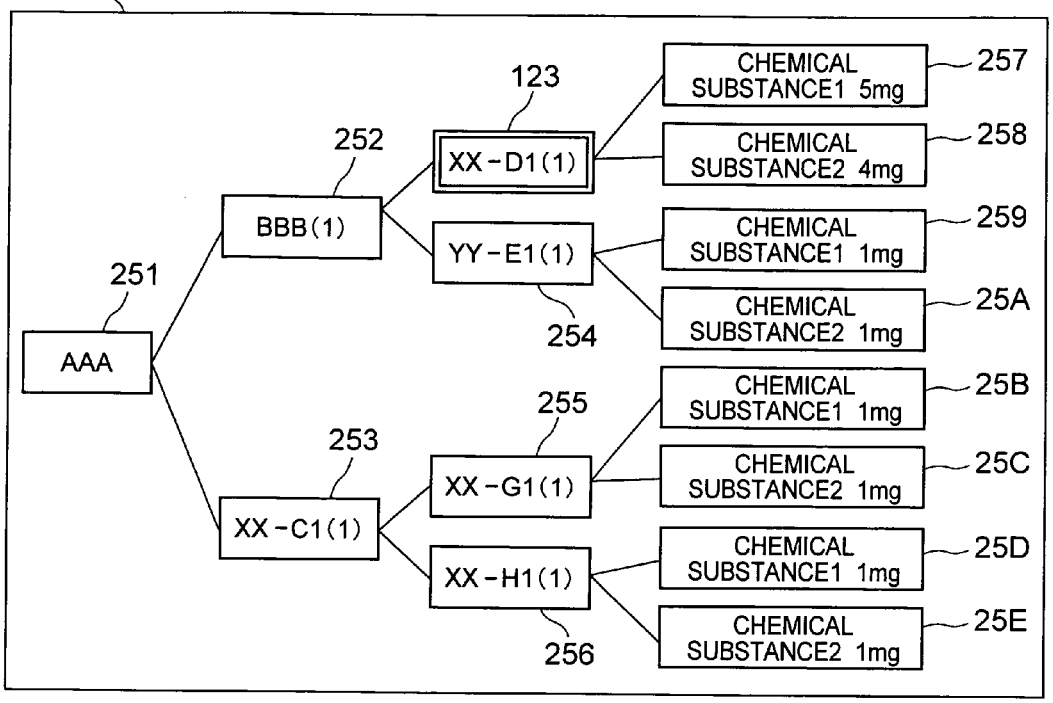
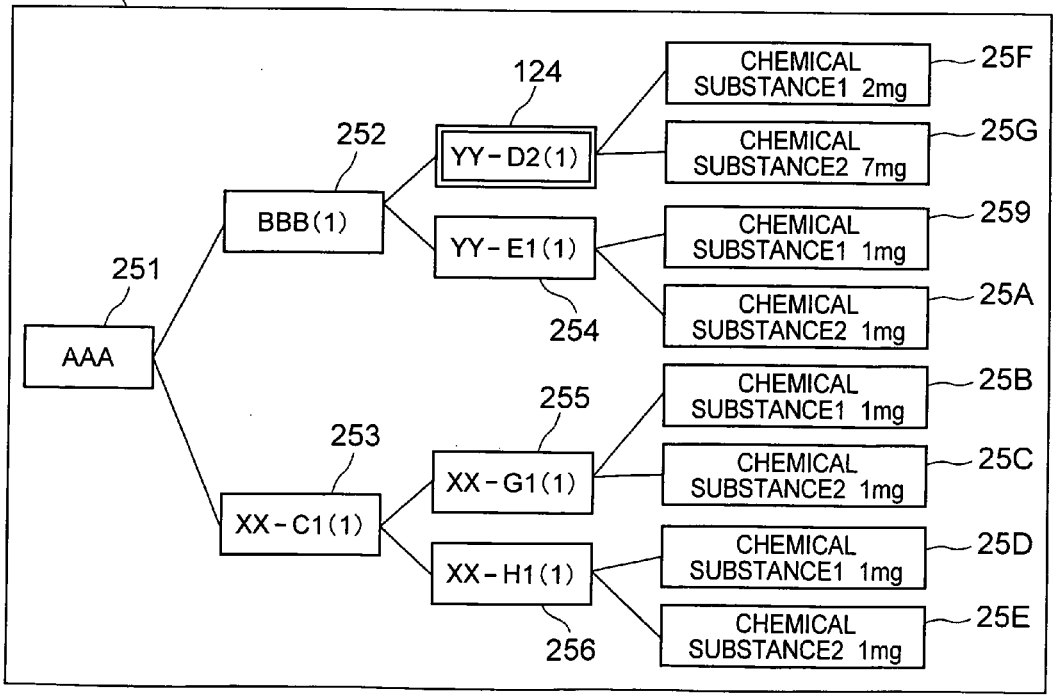

FIG.25

| PARTS BILL 261 | COMPANY NUMBER 262 | PARTS NUMBER 263 | ATTRIBUTE KIND 264 | CONTENT AMOUNT 265 | |
|---|---|---|---|---|---|
| 121 | XX | D1 | CHEMICAL SUBSTANCE 1 | 5mg | ~266 |
| 121 | XX | D1 | CHEMICAL SUBSTANCE 2 | 4mg | ~267 |
| 121 | YY | E1 | CHEMICAL SUBSTANCE 1 | 1mg | ~268 |
| 121 | YY | E1 | CHEMICAL SUBSTANCE 2 | 1mg | ~269 |
| 121 | XX | G1 | CHEMICAL SUBSTANCE 1 | 1mg | ~26A |
| 121 | XX | G1 | CHEMICAL SUBSTANCE 2 | 1mg | ~26B |
| 121 | XX | H1 | CHEMICAL SUBSTANCE 1 | 1mg | ~26C |
| 121 | XX | H1 | CHEMICAL SUBSTANCE 2 | 1mg | ~26D |
| 121 | XX | C1 | CHEMICAL SUBSTANCE 1 | | ~26E |
| 121 | XX | C1 | CHEMICAL SUBSTANCE 2 | | ~26F |
| 121 | | BBB | CHEMICAL SUBSTANCE 1 | | ~26G |
| 121 | | BBB | CHEMICAL SUBSTANCE 2 | | ~26H |
| 121 | | AAA | CHEMICAL SUBSTANCE 1 | | ~26I |
| 121 | | AAA | CHEMICAL SUBSTANCE 2 | | ~26J |
| 122 | YY | D2 | CHEMICAL SUBSTANCE 1 | 2mg | ~26K |
| 122 | YY | D2 | CHEMICAL SUBSTANCE 2 | 7mg | ~26L |
| 122 | YY | E1 | CHEMICAL SUBSTANCE 1 | 1mg | ~26M |
| 122 | YY | E1 | CHEMICAL SUBSTANCE 2 | 1mg | ~26N |
| 122 | XX | G1 | CHEMICAL SUBSTANCE 1 | 1mg | ~26O |
| 122 | XX | G1 | CHEMICAL SUBSTANCE 2 | 1mg | ~26P |
| 122 | XX | H1 | CHEMICAL SUBSTANCE 1 | 1mg | ~26Q |
| 122 | XX | H1 | CHEMICAL SUBSTANCE 2 | 1mg | ~26R |
| 122 | XX | C1 | CHEMICAL SUBSTANCE 1 | | ~26S |
| 122 | XX | C1 | CHEMICAL SUBSTANCE 2 | | ~26T |
| 122 | | BBB | CHEMICAL SUBSTANCE 1 | | ~26U |
| 122 | | BBB | CHEMICAL SUBSTANCE 2 | | ~26W |
| 122 | | AAA | CHEMICAL SUBSTANCE 1 | | ~26X |
| 122 | | AAA | CHEMICAL SUBSTANCE 2 | | ~26Y |

FIG.27

| PARTS BILL | COMPANY NUMBER | PARTS NUMBER | ATTRIBUTE KIND | CONTENT AMOUNT |
|---|---|---|---|---|
| 121 | XX | D1 | CHEMICAL SUBSTANCE 1 | 5mg |
| 121 | XX | D1 | CHEMICAL SUBSTANCE 2 | 4mg |
| 121 | YY | E1 | CHEMICAL SUBSTANCE 1 | 1mg |
| 121 | YY | E1 | CHEMICAL SUBSTANCE 2 | 1mg |
| 121 | XX | G1 | CHEMICAL SUBSTANCE 1 | 1mg |
| 121 | XX | G1 | CHEMICAL SUBSTANCE 2 | 1mg |
| 121 | XX | H1 | CHEMICAL SUBSTANCE 1 | 1mg |
| 121 | XX | H1 | CHEMICAL SUBSTANCE 2 | 1mg |
| 121 | XX | C1 | CHEMICAL SUBSTANCE 1 | 2mg |
| 121 | XX | C1 | CHEMICAL SUBSTANCE 2 | 2mg |
| 121 |  | BBB | CHEMICAL SUBSTANCE 1 | 6mg |
| 121 |  | BBB | CHEMICAL SUBSTANCE 2 | 5mg |
| 121 |  | AAA | CHEMICAL SUBSTANCE 1 | 8mg |
| 121 |  | AAA | CHEMICAL SUBSTANCE 2 | 7mg |
| 122 | YY | D2 | CHEMICAL SUBSTANCE 1 | 2mg |
| 122 | YY | D2 | CHEMICAL SUBSTANCE 2 | 7mg |
| 122 | YY | E1 | CHEMICAL SUBSTANCE 1 | 1mg |
| 122 | YY | E1 | CHEMICAL SUBSTANCE 2 | 1mg |
| 122 | XX | G1 | CHEMICAL SUBSTANCE 1 | 1mg |
| 122 | XX | G1 | CHEMICAL SUBSTANCE 2 | 1mg |
| 122 | XX | H1 | CHEMICAL SUBSTANCE 1 | 1mg |
| 122 | XX | H1 | CHEMICAL SUBSTANCE 2 | 1mg |
| 122 | XX | C1 | CHEMICAL SUBSTANCE 1 | 2mg |
| 122 | XX | C1 | CHEMICAL SUBSTANCE 2 | 2mg |
| 122 |  | BBB | CHEMICAL SUBSTANCE 1 | 3mg |
| 122 |  | BBB | CHEMICAL SUBSTANCE 2 | 8mg |
| 122 |  | AAA | CHEMICAL SUBSTANCE 1 | 5mg |
| 122 |  | AAA | CHEMICAL SUBSTANCE 2 | 10mg |

FIG.28
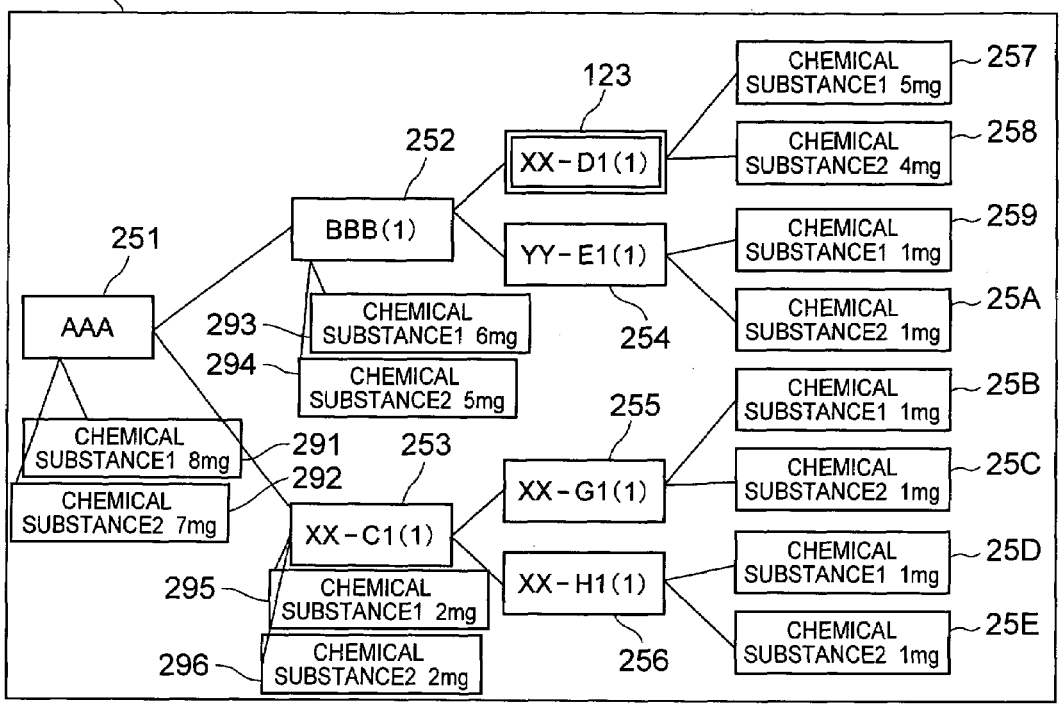
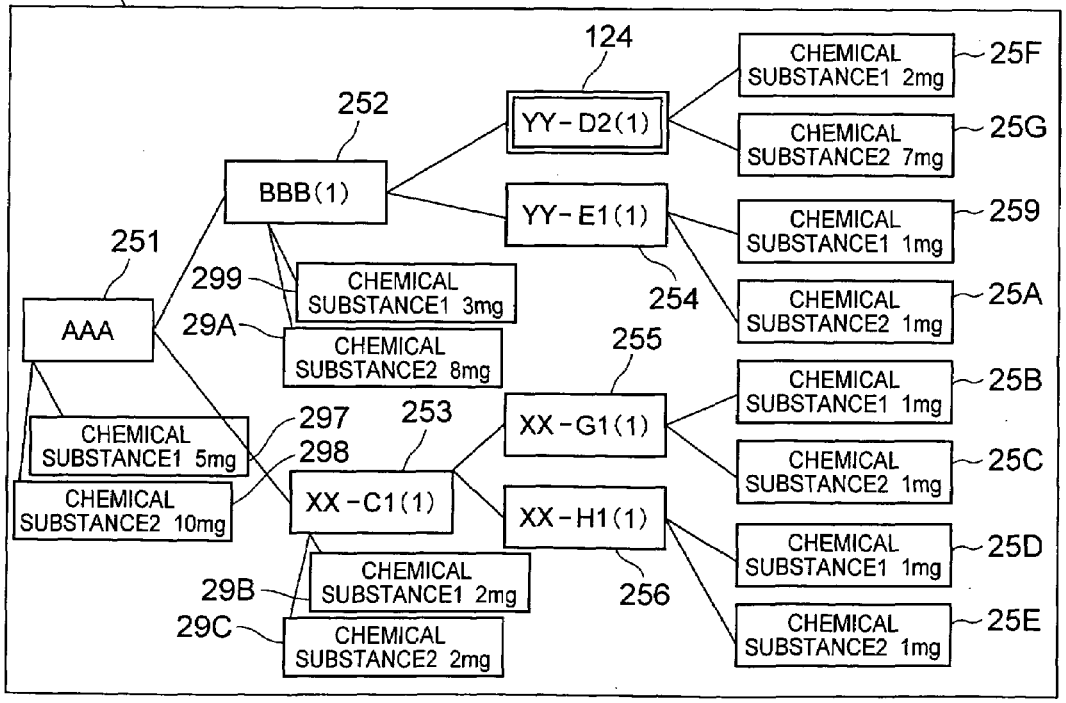

FIG.31

| ATTRIBUTE (CHEMICAL SUBSTANCE) | ATTRIBUTE GENERIC CLASSIFICATION (REGULATION / REPORT DESTINATION) | ATTRIBUTE SPECIES CLASSIFICATION (SUBSTANCE GROUP) | CONVERSION COEFFICIENT | |
|---|---|---|---|---|
| CHEMICAL SUBSTANCE 1 | OWN | A1 | 1 | ~325 |
| CHEMICAL SUBSTANCE 2 | OWN | A2 | 0.45 | ~326 |
| CHEMICAL SUBSTANCE 3 | OWN | A3 | 0.55 | ~327 |
| CHEMICAL SUBSTANCE 1 | RoHS | LEAD | 1 | ~328 |
| CHEMICAL SUBSTANCE 2 | RoHS | LEAD | 1 | ~329 |
| CHEMICAL SUBSTANCE 3 | RoHS | MERCURY | 1 | ~32A |

| ATTRIBUTE (CHEMICAL SUBSTANCE) | ATTRIBUTE GENERIC CLASSIFICATION (REGULATION / REPORT DESTINATION) | CORRESPONDING ATTRIBUTE (REGULATION / REPORT DESTINATION SUBSTANCE) | CONVERSION COEFFICIENT | |
|---|---|---|---|---|
| CHEMICAL SUBSTANCE 1 | RoHS | LEAD OXIDE | 1 | ~335 |
| CHEMICAL SUBSTANCE 2 | RoHS | LEAD CARBONATEE | 1 | ~336 |
| CHEMICAL SUBSTANCE 3 | RoHS | MERCURY OXIDE | 1 | ~337 |

| COMPANY NUMBER (341) | PARTS NUMBER (342) | REGULATION / REPORT DESTINATION (343) | SUBSTANCE GROUP (344) | CONTENT AMOUNT (345) | |
|---|---|---|---|---|---|
| XX | D1 | OWN | A1 | 5mg | ~346 |
| XX | D1 | RoHS | LEAD | 5mg | ~347 |
| XX | D1 | OWN | A2 | 1.8mg | ~348 |
| XX | D1 | RoHS | LEAD | 4mg | ~349 |
| YY | D2 | OWN | A1 | 2mg | |
| YY | D2 | RoHS | LEAD | 2mg | |
| YY | D2 | OWN | A2 | 7mg | |
| YY | D2 | RoHS | LEAD | 3.15mg | |
| YY | E1 | OWN | A1 | 1mg | |
| YY | E1 | RoHS | LEAD | 1mg | |
| YY | E1 | OWN | A2 | 0.45mg | |
| YY | E1 | RoHS | LEAD | 1mg | |
| XX | G1 | OWN | A1 | 1mg | |
| XX | G1 | RoHS | LEAD | 1mg | |
| XX | G1 | OWN | A2 | 0.45mg | |
| XX | G1 | RoHS | LEAD | 1mg | |
| XX | H1 | OWN | A1 | 1mg | |
| XX | H1 | RoHS | LEAD | 1mg | |
| XX | H1 | OWN | A2 | 0.45mg | |
| XX | H1 | RoHS | LEAD | 1mg | |

FIG.35

| COMPANY NUMBER | PARTS NUMBER | REGULATION / REPORT DESTINATION | REGULATION / REPORT DESTINATION SUBSTANCE | CONTENT AMOUNT |
|---|---|---|---|---|
| XX | D1 | RoHS | LEAD OXIDE | 5mg |
| XX | D1 | RoHS | LEAD CARBONATEE | 4mg |
| YY | D2 | RoHS | LEAD OXIDE | 2mg |
| YY | D2 | RoHS | LEAD CARBONATEE | 7mg |
| YY | E1 | RoHS | LEAD OXIDE | 1mg |
| YY | E1 | RoHS | LEAD CARBONATEE | 1mg |
| XX | G1 | RoHS | LEAD OXIDE | 1mg |
| XX | G1 | RoHS | LEAD CARBONATEE | 1mg |
| XX | H1 | RoHS | LEAD OXIDE | 1mg |
| XX | H1 | RoHS | LEAD CARBONATEE | 1mg |

FIG.36

PARTS | | | | | | REPORT DESTINATION(RoHS)ADMINISTRATION | | |
---|---|---|---|---|---|---|---|---
PARTS NUMBER | PARTS NAME | CORRESPONDENT CODE | CORRESPONDENT PARTS NUMBER | PARTS NUMBER | PARTS MASS(kg) | SUBSTANCE NAME | CONTENT PERCENTAGE | SUBSTANCE MASS
AA-50N5-024 | POWER SUPPLY CORD | | | 1 | 0.05 | | |
 | | | | | | VINYL CHLORIDE MONOMER | 99000ppm | 7920.000mg
 | | | | | | LEAD | 2000ppm | 60.000mg
 | | | | | | CADMIUM | 1ppm | 0.050mg
GG-50N5-024 | POWER SUPPLY CORD | 22222 | GG-50N5-024 | 1 | 0.05 | | |
 | | | | | | VINYL CHLORIDE MONOMER | 79000ppm | 6320.000mg
 | | | | | | LEAD | 2000ppm | 60.000mg
F170000 | VINYL CHLORIDE RESIN | 22222 | F170000 | 0.08 | | VINYL CHLORIDE MONOMER | 79000ppm | 79000.000mg
A6230000 | COPPER WIRE | 22222 | A6230000 | 0.03 | 1 | | |
 | | | | | | LEAD | 2000ppm | 2000.000mg
FF-50N5-024 | POWER SUPPLY CORD | 10000 | FF-50N5-024 | 1 | 0.13 | | |
 | | | | | | VINYL CHLORIDE MONOMER | 99000ppm | 7920.000mg
 | | | | | | LEAD | 1000ppm | 50.000mg
 | | | | | | CADMIUM | 1ppm | 0.050mg
A6230000 | COPPER WIRE | 10000 | A6230000 | 0.05 | 1 | | |
 | | | | | | VINYL CHLORIDE MONOMER | 1000ppm | 1000.000mg
 | | | | | | LEAD | 1ppm | 1.000mg
F170000 | VINYL CHLORIDE RESIN | 10000 | F170000 | 0.08 | | VINYL CHLORIDE MONOMER | 99000ppm | 99000.000mg

FIG.37

| | PARTS | | | 1:LEAD AND ITS COMPOUND | | 2:CADMIUM AND ITS COMPOUND | | 3:MERCURY AND ITS COMPOUND | | 4:HEXAMONOVALENT CHROMIUM COMPOUND | |
|---|---|---|---|---|---|---|---|---|---|---|---|
| PARTS NUMBER | PARTS NAME | CORRESPONDENT CODE | CORRESPONDENT PARTS NUMBER | METAL CONTENT | METAL CONTENT PERCENTAGE | METAL CONTENT | METAL CONTENT PERCENTAGE | METAL CONTENT | METAL CONTENT PERCENTAGE | METAL CONTENT | METAL CONTENT PERCENTAGE |
| | COPPER WIRE | 10000 | A6230000 | 0.001mg | 1000.00ppm | 0.000mg | 1.00ppm | 0.000mg | 0.00ppm | 0.000mg | 0.00ppm |
| | POLYSTYRENE (PS) | 10000 | F110220 | 0.000mg | 0.00ppm | 0.000mg | 0.00ppm | 0.010mg | 10000.00ppm | 0.000mg | 0.00ppm |
| | SUS403 | 10000 | F130660 | 0.023mg | 23000.00ppm | 0.000mg | 1.00ppm | 0.000mg | 0.00ppm | 0.000mg | 0.00ppm |
| | RAW MATERIAL 1 FOR POLYETHYLENE MOLDING | 10000 | F141010 | 0.000mg | 0.00ppm | 0.000mg | 1.00ppm | 0.000mg | 0.00ppm | 0.000mg | 0.00ppm |
| | POLYPROPYLENE STANDARD MOLDING RAW MATERIAL | 10000 | F1510007 | 0.023mg | 23000.00ppm | 0.000mg | 0.00ppm | 0.000mg | 0.00ppm | 0.000mg | 0.00ppm |
| | COPPER WIRE | 22222 | A6230000 | 0.002mg | 2000.00ppm | 0.000mg | 0.00ppm | 0.000mg | 0.00ppm | 0.000mg | 0.00ppm |

| PARTS NUMBER 401 | PARTS NAME 402 | CORRESPONDENT COMPANY NUMBER 403 | ATTRIBUTE 1 (PARTS MATERIAL SORT) 404 | ATTRIBUTE 2 (MASS) 405 | ATTRIBUTE 3 (MATERIAL KIND) 406 |
|---|---|---|---|---|---|
| D1 | PART C1 | XX | PART | | |
| D1 | PART D1 | XX | PART | | |
| G1 | MATERIAL G1 | XX | MATERIAL | 1g | POLYETHYLENE |
| H1 | MATERIAL H1 | XX | MATERIAL | 2g | NATURAL RUBBER |
| D2 | PART D2 | YY | PART | | |
| E1 | PART E1 | YY | PART | | |

| | | PARTS | | | MATERIAL SORT | |
|---|---|---|---|---|---|---|
| PARTS NUMBER | PARTS NAME | CORRESPONDENT CODE | CORRESPONDENT PARTS NUMBER | PARTS QUANTITY | MATERIAL CLASSIFICATION NAME | MASS |
| AA-8S-C001 | FULL-AUTOMATED WASHING MACHINE 8 | | | 1 | | |
| AA-8S-B006 | INNER TANK 8 | | | 1 | | |
| AA-8S-A006 | OUTER TANK 8 | | | 1 | | |
| AA-70R1-Z037 | SCREW | | | 2 | | |
| AA-70R1-037 | HOSE HOLDER | | | 1 | | |
| AA-52X-002 | TUBE CLIP | | | 1 | | |
| AA-52X-603 | TUBE | | | 1 | | |
| | TUBE | 10000 | FF-52X-603 | | POLYSTYRENE(PS) | 0.030kg |
| AA-8S-006 | OUTER TANK 8 | 10000 | FF-8S-006 | 1 | | |
| | OUTER TANK 8 | | | 1 | ZINC PLATED STEEL PLATE | 3.040kg |
| AA-8S-005 | HANGER BAR | | | 4 | | |
| | HANGER BAR | 10000 | FF-8S-005 | 1 | PS(POLYSTYRENE) | 0.142kg |

| | PARTS | | | | | MATERIAL | | REPORT DESTINATION (RoHS) ADMINISTRATION | | |
|---|---|---|---|---|---|---|---|---|---|---|
| PARTS NUMBER | PARTS NAME | CORRESPONDENT CODE | CORRESPONDENT PARTS NUMBER | PARTS QUANTITY | MASS | MATERIAL CLASSIFICATION NAME | MASS | SUBSTANCE NAME | CONTENT PERCENTAGE | MASS |
| AA-50N5-024 | POWER SUPPLY CORD | | | 1 | 0.05 | | | | | |
| | | | | | | VINYL CHLORIDE RESIN | 0.08kg | | | |
| | | | | | | | | VINYL CHLORIDE MONOMER | 79000ppm | 7920.000mg |
| | | | | | | COPPER WIRE | 0.050kg | | | |
| | | | | | | | | LEAD | 2000ppm | 60.00mg |
| | | | | | | | | CADMIUM | 1ppm | 0.050mg |
| GG-50N5-024 | POWER SUPPLY CORD | 22222 | GG-50N5-024 | 1 | 0.05 | | | | | |
| | | | | | | VINYL CHLORIDE RESIN | 0.080kg | | | |
| | | | | | | | | VINYL CHLORIDE MONOMER | 79000ppm | 79000mg |
| | | | | | | COPPER WIRE | 0.030kg | | | |
| | | | | | | | | LEAD | 2000ppm | 2000mg |
| FF-50N5-024 | POWER SUPPLY CORD | 10000 | FF-50N5-024 | 1 | 0.13 | | | | | |
| | | | | | | VINYL CHLORIDE RESIN | 0.080kg | | | |
| | | | | | | | | VINYL CHLORIDE MONOMER | 99000ppm | 99000mg |
| | | | | | | COPPER WIRE | 0.050kg | | | |
| | | | | | | | | LEAD | 1000ppm | 1000mg |
| | | | | | | | | CADMIUM | 1ppm | 1mg |

DESIGN AND MANUFACTURE AIDING APPARATUS AND METHOD

BACKGROUND OF THE INVENTION

The present invention relates to design/manufacture support system, design/manufacture support program and design/manufacture support method for managing design/manufacture by using a bill of parts.

In recent years, the environmental regulation for products including RoHS regulation (prohibiting as a rule the use of 6 harmful substances in a process ranging from production of electric/electronic apparatus to disposal thereof) has been become stringent.

To comply with the regulation, manufacturing makers must collect the mass of a chemical substance contained in a part purchased from a correspondent parts maker, totalize masses of the content chemical substances in a product and evidence that the company's own product does not violate the regulation.

"Environmental information simulation system, apparatus and method as well as storage medium" described in JP-A-2002-49649 (Patent Document 1) can evaluate environmental information by using environmental information of the same kinds of parts even when totalization of environmental information of a product is insufficient.

SUMMARY OF THE INVENTION

In evaluating a product, including the chemical substance totalization, a problem arises when a part is purchased from a plurality of makers. The plural-maker purchase referred to herein signifies the case that parts differently produced by plural makers are purchased for the same part. The plural-maker purchase parts are not always identical in chemical substance content. Accordingly, as well-known in the art, the chemical substance of a product containing parts as represented by plural candidates for the plural-maker purchase parts is determined by the safety authority to take the maximum value in view of content regulation. In addition, a plurality of harmful chemical substances need to be evaluated and in the case of a part for which a plurality of candidates exist, trade-off among the content amounts of plural chemical substances must sometimes be considered.

Then, when totalizing a plurality of chemical substances for a product containing parts represented by a plurality of candidates, the totalization must be conducted after selecting the maximum content amount in respect of the individual chemical substances.

The Patent Document 1 describes that in calculation of the content amount of harmful substances in the case of the plural-maker purchase, the maximum content amount is supposed to be chosen in respect of individual harmful substances and is integrated for the substances. Nut the reference fails to disclose any practical carrying-out form.

Meanwhile, the evaluation of chemical substance of a product is otherwise needed for feedback to design. Not only the total mass of chemical substances in a product is made to be known but also the totalized chemical substance mass is consulted in relation to individual parts and components on a parts bill in making an effort to reduce chemical substance in unit of parts.

Especially in handling a part for which a plurality of candidates exist in the case of, for example, the plural-maker purchase, there is a need of determining trade-off among chemical substance masses of the plural candidates by comparing the chemical substance masses contained in the plural candidates for the part.

The Patent Document 1, however, does not describe how to display a parts bill when a plurality of candidates possibly exist in the case of plural-maker purchase or how to totalize chemical substances and to display the results in that case. Accordingly, the technique based on the Patent Document 1 encounters a problem that when a plurality of candidates for a part adopted for a company's own product exist, it is difficult for the designer to design by taking into account the trade-off among harmful substance content amounts of the individual candidates for the part.

A first object of the present invention is therefore to provide a design support system which can design by taking into account the trade-off among harmful substance content amounts when a plurality of candidates for a part exist and individual candidate parts are chosen.

A second object of the present invention is to provide a design/manufacture support system which can create a parts bill for a product by combining a company's own (or self company) parts bill and a correspondent (or business acquaintance) parts bill and totalize amounts of attributes of the product from the created parts bill and the amount of attributes such as chemical substance mass contained in the product.

According to one aspect of the invention, a design/manufacture support system comprises a self company/correspondent parts number correspondence storing unit for storing the correspondence between a parts number of a self company part and that of a correspondent part, a self company parts bill storage unit for storing a structure of parts of a self company product, a correspondent parts bill storage unit for storing a structure of parts purchased from a correspondent, a representative part creation unit for creating a representative part from the correspondence between the self company parts number and business correspondent part number which are stored in the self company/correspondent parts number storing unit, a parts bill creation unit for creating a parts bill from the representative part created by the representative part creation unit, the self company parts bill stored in the self company parts bill storage unit and the correspondent parts bill stored in the correspondent parts bill storage unit, an input unit for inputting data to the self company/correspondent parts number correspondence storing unit, the self company parts bill storage unit and the correspondent parts bill storage unit, and an output unit for delivering the parts bill created by the parts bill creation unit.

According to another aspect of the invention, a design/manufacture support system comprises a self company/correspondent parts number correspondence storing unit for storing the correspondence between a part number of a self company part and that of a correspondent part, a self company parts bill storage unit for storing a structure of parts of a self company product, a correspondent parts bill storage unit for storing a structure of parts purchased from a correspondent, a parts bill creation unit for creating a parts bill from the correspondence between a part number of a self company part and that of a correspondent part stored in the self company/correspondent parts number correspondence storing unit, the self company parts bill stored in the self company parts bill storage unit and the correspondent parts bill stored in the correspondent parts bill storage unit, a parts attribute storage unit for storing parts attributes such as masses of content chemical substances, a parts attribute retrieval unit for retrieving, from the parts attribute storage unit, attributes added to the individual parts constituting the parts bill created by the parts bill creation unit, a product attribute totalization unit for totalizing attributes of a product from the parts bill created by the parts bill creation unit and the attributes retrieved by the parts attributes retrieval unit, an input unit for inputting data to the self company/correspondent parts number correspondence storing unit, the self company parts bill storage unit and the correspondent parts bill storage unit, and an output unit for delivering the parts bill created by the parts bill creation unit and the result totalized by the product attribute totalization unit.

According to still another aspect of the invention, a design/manufacture support system comprises a self company/correspondent parts number correspondence storing unit for storing the correspondence between a part number of a self company part and that of a correspondent part, a self company parts bill storage unit for storing a structure of parts of a self company product, a correspondent parts bill storage unit for storing a structure of parts purchased from a correspondent, a representative part creation unit for creating a representative part from the correspondence between self company part number and correspondence part number stored in the self company/correspondent parts number correspondence storing unit, a parts bill creation unit for creating a parts bill from the representative part created by the representative part creation unit, the self company parts bill stored in the self company parts bill storage unit and the correspondent parts bill stored in the correspondent parts bill storage unit, a parts attribute storage unit for storing parts attributes such as masses of content chemical substances, a parts attribute retrieval unit for retrieving, from the parts attribute storage unit, attributes added to the individual parts constituting the parts bill created by the parts bill creation unit, a product attribute totalization unit for totalizing attributes of a product from the parts bill created by the parts bill creation unit and the attributes retrieved by the parts attributes retrieval unit, an input unit for inputting data to the self company/correspondent parts number correspondence storing unit, the self company parts bill storage unit and the correspondent parts bill storage unit, and an output unit for delivering the parts bill created by the parts bill creation unit and the result totalized by the product attribute totalization unit.

According to the present invention, a design support system can be provided which can design by taking into account the trade-off among harmful substance content amounts when a plurality of candidates for a part exist and individual candidate parts are chosen.

BRIEF DESCRIPTION OF THE DRAWINGS

FIG. 2 is a table for explaining an example of storage items of a self company/correspondent parts number correspondence storing unit 1.

FIG. 3 is a table for explaining an example of data items of PN data of a self company parts bill storage unit 2.

FIG. 6 is a table for explaining an example of storage items of PN data representative of basic attribute data such as names of correspondent parts.

FIG. 12 is a diagram showing an example of a parts bill creating method for creating a parts bill in respect of individual plural candidates for a part.

FIG. 18 is a table for explaining an example of storage items of the parts attribute storage unit 6.

FIG. 21 is a table showing an example of storage items of the totalization result storage unit and data therein.

FIG. 23 is a table showing the state of the totalization result storage unit at the time that the process by the product attribute totalization unit 8 ends.

FIG. 24 is a diagram showing that attributes are retrieved and added to the parts bill through the process by the parts attributes retrieval unit 7.

FIG. 25 is a table showing an example of storage items of the totalization result storage unit and data therein.

FIG. 27 is a table showing the state of the totalization result storage unit at the time that the process by the product attributes totalization unit ends.

FIG. 28 is a diagram showing an example in which chemical substance content amounts representative of the results of totalization by the product attributes totalization unit are added to the parts bill and displayed.

FIG. 31 is a first table showing an example of concrete storage items of an attribute classification storage unit.

FIG. 32 is a second table showing an example of concrete storage items of the attribute classification storage unit.

FIG. 33 is a first table showing an example of storage items of an attribute classification dependent attribute value storing unit.

FIG. 35 is a second table showing an example of storage items of the classification dependent attribute value storage unit.

FIG. 36 is a diagram for explaining a first screen example which can be realized by providing the classification dependent attribute value storage unit.

FIG. 37 is a table for explaining a second screen example which can be realized by providing the classification dependent attribute value storage unit.

FIG. 41 is a table showing a first screen example of the results totalized by the material kind totalization unit.

FIG. 42 is a table showing a second screen example of the results totalized by the material kind totalization unit.

DETAILED DESCRIPTION OF THE EMBODIMENTS

Embodiments of a design/manufacture support system according to the present invention will now be described with reference to FIGS. 1 to 42.

1. Embodiment 1

Figure 1:
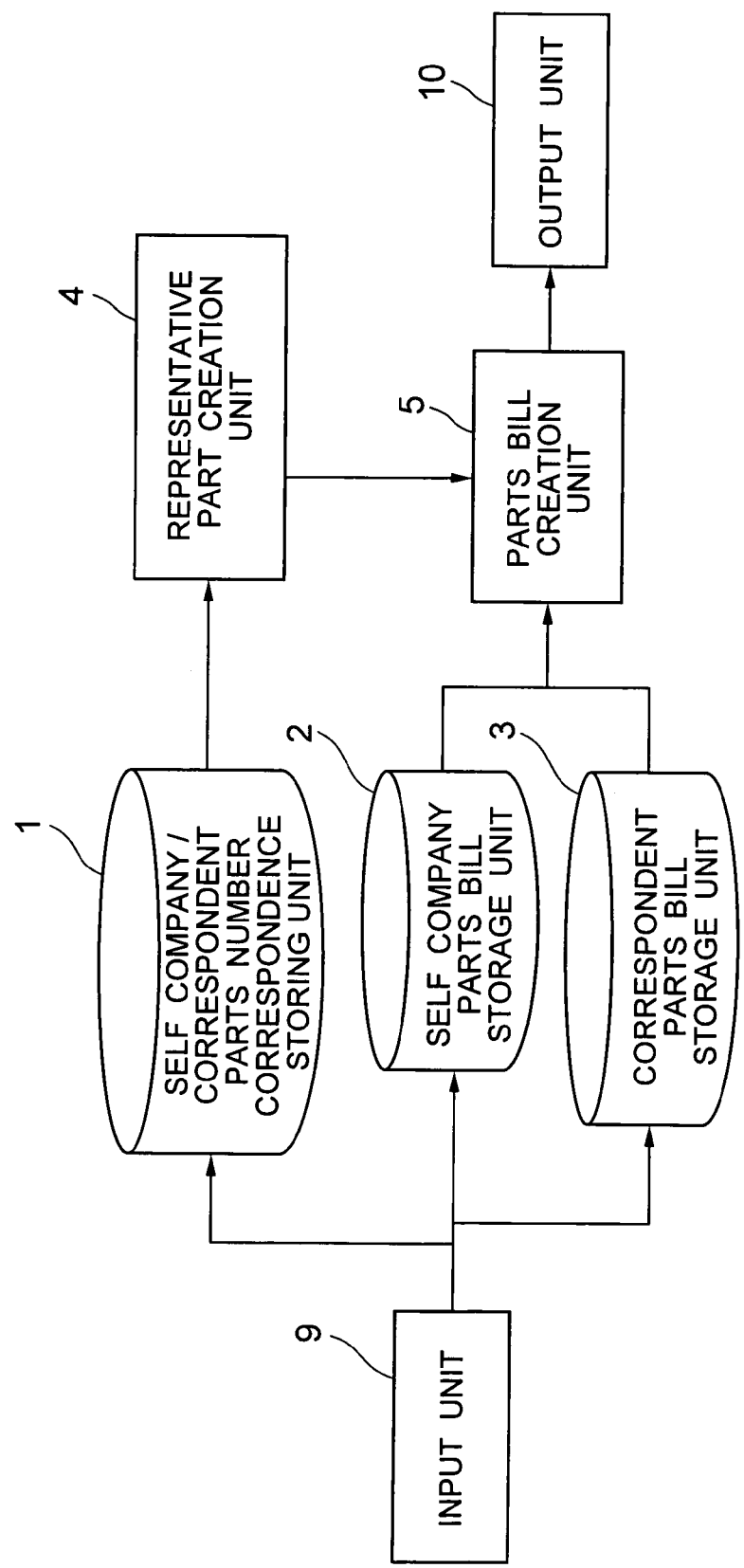
FIG. 1 is a block diagram showing the construction of a first embodiment of a design/manufacture support system according to the present invention.

Referring first to FIG. 1, a first embodiment of the design/manufacture support system according to the invention is constructed as illustrated therein in block diagram form.

The design/manufacture support system shown in FIG. 1 comprises a self company/correspondent parts number correspondence storing unit 1 for storing the correspondence between a part number of a self company part and that of a correspondent part, a self company parts bill storage unit 2 for storing a structure of parts of a self company product, a correspondent parts storage unit 3 for storing a structure of parts purchased from a correspondent, a representative part creating unit 4 for creating a representative part, a parts bill creation unit 5 for creating a parts bill from the representative part created by the representative part creation unit, the self company parts bill stored in the self company parts bill storage unit and the correspondent parts bill stored in the correspondent parts bill storage unit, an input unit 9 and an output unit 10.

The constituent components of the first embodiment will be described in sequential order.

The self company/correspondent parts number correspondence storing unit 1 stores the correspondence between a part number of a self company part and that of a correspondent part in respect of a part purchased from the correspondent among parts constituting a product. In makers manufacturing parts and products, parts handled by each company internally thereof are managed by allotting parts numbers based on a system of its own maker. Accordingly, different parts numbers are ordinarily allotted to even the same part by a maker manufacturing the part and a maker purchasing the part as part of a self company product to manufacture the product. In an example to be described hereunder, a maker purchasing a part as part of a self company product is termed a self company and a company from which the self company purchases the part is termed a correspondent.

An example of storage items of the self company/correspondent parts number correspondence storing unit 1 is shown in FIG. 2.

An example of items stored in the self company/correspondent parts number correspondence storing unit 1 is shown in columns 21 to 23 and an example of data entered in the self company/correspondent parts number correspondence storing unit 1 is shown in lines 24 to 27. Indicated in column 21 are self company parts numbers for identifying self company parts. Correspondent company numbers are indicated in column 22 and correspondent parts numbers are indicated in column 23, so that these two numbers are combined to specify or identify a correspondent part.

Data in line 24 signifies that a part specified by a self company number "CCC" is identical to a part specified by a number "C1" of a correspondent company specified by a number "XX". In other words, the part specified by "CCC" in the self company is identified by the number "C1" in the "XX" company.

The self company parts bill storage unit 2 is a unit for storing a structure of parts of a self company product.

Figures 4, 5:
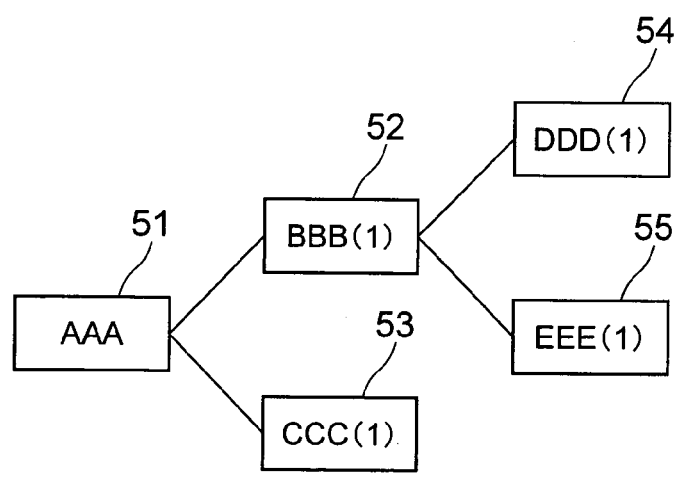
FIG. 4 is a table for explaining an example of storage items of PS data of the self company parts bill storage unit 2.
FIG. 5 is a diagram for explaining an example in which PS data of the self company parts bill storage unit 2 is indicated in a parts bill.

Referring to FIGS. 3 to 5, an example of a practiced form of self company parts bill storage unit 2 will be described. In the present embodiment, the self company parts bill storage unit 2 includes (1) basic attribute data such as names of parts constituting a self company product (hereinafter referred to as PN data) and (2) parent/child data of parts indicating a hierarchical structure of the product by describing the parent/child relation of constituents of the product (hereinafter referred to as PS data).

Exemplified in FIG. 3 are data items of the PN data of self company parts bill storage unit 2. In columns 31 to 35, an example of storage items of parts attribute data is indicated and in lines 36 to 40, an example of data items to be entered. The column 31 corresponds to parts number and column 32 corresponds to parts name. The columns 33 to 35 correspond to storage columns of attribute items and necessary basic attributes such as parts mass and parts price depending on the utilization of the parts bill. It will be appreciated that the number of attribute items can be determined arbitrarily depending on the utilization of the parts bill. Taking data in line 36 of the PN data, for instance, a part of part number "AAA" can be specified as having a name of "part A".

Turning to FIG. 4, storage items of the PS data of self company parts bill storage unit 2 are exemplified as shown therein. In columns 41 to 43, an example of storage items is indicated and in lines 44 to 47, data to be entered is exemplified. The column 41 corresponds to parts numbers of parent parts, column 42 to parts numbers of child parts and column 43 to the quantity. From data shown in FIG. 4, such a parent/child relation of parts that BBB is a child part of AAA, CCC is a child part of AAA, DDD is a child part of BBB and EEE is a child part of BBB can be readable. By indicating a part in the form of a node and the parent/child relation in the form of a link, a tree structured parts bill as shown in FIG. 5 can be obtained. In the figure, the parenthesized numeral indicates the number of parts.

As will be seen from the above, the self company parts bill storage unit stores the PS data indicative of a structure of a self company product and the PN data, that is, the basic attribute information concerning individual constituent parts. In the present embodiment, the PN data and PS data are stored in different tables but this is not always necessary and these pieces of data can be managed by using the same table.

The correspondent parts bill storage unit 3 will now be described by making reference to FIGS. 6 to 8. Storage items of PN data representative of basic attribute data such as names of correspondent parts are exemplified in FIG. 6 and storage items of PS data representative of a structure of the correspondent parts are exemplified in FIG. 7. The items to be stored in the PN data and PS data are substantially the same as those in the self company parts bill storage unit 2. But the number of correspondents acquainted with the self company is not always one and there is a great possibility that parts numbers are administrated pursuant to enumerating methods which independently differ correspondent by correspondent. For these reasons, a part number is specified by a part correspondent company number and a number allotted to the part in the correspondent company. Accordingly, in comparison with the PN data in the self company parts bill storage unit of FIG. 3, a column 63 indicative of the correspondent company number is added to the storage items of PN data in FIG. 6. Further, in comparison with the PS data in the self company parts bill storage unit of FIG. 4, a column 71 indicative of the parent parts company number and a column 73 representative of the child parts company number are added to the storage items of PS data in FIG. 7.

Figures 7, 8:
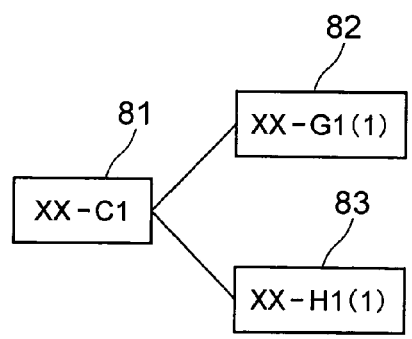
FIG. 7 is a table for explaining an example of storage items of PS data representative of a structure of correspondent parts.
FIG. 8 is a diagram for explaining an example in which PS data of the correspondent parts bill storage unit 3 is indicated in a parts bill.

By indicating a part in the form of a node and the parent/child relation of parts in the form of a link, a correspondent parts bill based on the examples of FIGS. 6 and 7 can be obtained as illustrated in FIG. 8. From the parent/child description of the PS data in FIG. 7, C1 of XX company in node 81, G1 of XX company in node 82 and H1 of XX company in node 83 can be expressed in a parts tree structure having C1 as the parent parts.

In the foregoing, the correspondent parts bill storage unit 3 has been described as being structurally separate from the self company parts bill storage unit 2 but in an alternative, the self company parts bill storage unit 2 and the correspondent parts bill storage unit may be integrated and managed. Since structural requirements in the present invention are such that in order to clarify (1) whether a part is of a self company part or a correspondent part and (2) which correspondent company a correspondent part belongs to, the number capable of identifying the self company is described for a self company part in the correspondent company number 63 in FIG. 6 and parent arts company number 71 and child parts company number 73 in FIG. 7, thereby permitting the correspondent parts storage unit 3 to also collectively manage the self company parts.

Next, the representative part creation unit 4 and parts bill creation unit 5 will be described collectively for convenience of explanation.

The representative part creation unit 4 is for creating a representative part, which is expressed by a self company part number, by setting up the parent/child relation between a self company part number and a correspondent part number stored in the self company/correspondent parts number correspondence storing unit 1 and substituting these parts numbers into PS data.

The parts bill creation unit 5 is for creating, from the self company parts bill storage unit 2, correspondent parts bill storage unit 3 and the representative part created by the representative part creation unit 4, a parts bill which combines self company and correspondent parts bills.

Since the present invention features creation of a parts bill by using the representative part created by the representative part creation unit 4, a description will be given by comparing a conventional process executed in the absence of the representative part creation unit 4 with a process in which a parts bill is created through the use of a representative part created by the representative part creation unit 4.

Figure 9:
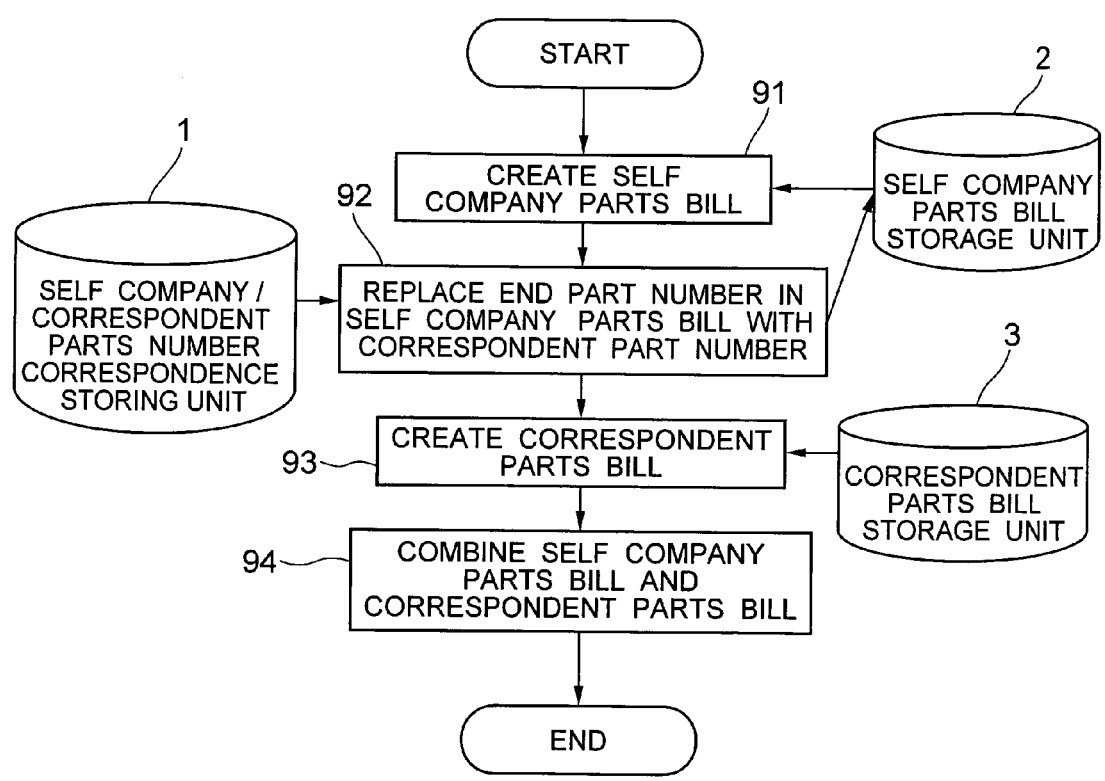
FIG. 9 is a flowchart of a process in a conventional parts bill creation unit 5 lacking a representative part creation unit 4.

With reference to a flowchart shown in FIG. 9, the process is shown which is executed with a parts bill creation unit 5 without resort to the representative part creation unit 4 in the comparative example.

In step 91, data is read out of the self company parts bill storage unit 2 to create a self company parts bill. Specifically, PS data and PN data in the self company parts bill storage unit 2 described in connection with FIGS. 3 and 4 are read to create a tree structure of parts as shown in FIG. 5.

A description will be given below on the assumption that a parts bill of a product indicated by a part number AAA is created as shown in FIG. 5 from the self company parts bill storage unit 2.

In step 92, an end part number in the self company parts bill is replaced with a correspondent part number.

In this process, the end part number in the self company parts bill is retrieved from self company parts numbers in the column 21 in the self company/correspondent parts number correspondence storing unit 1 to acquire a corresponding correspondent company number and a corresponding correspondent-part number. Then, the end part number is replaced with the acquired correspondent part number. The state of the self company parts bill at the time of completion of the step 92 is shown in FIG. 10.

Figure 10:
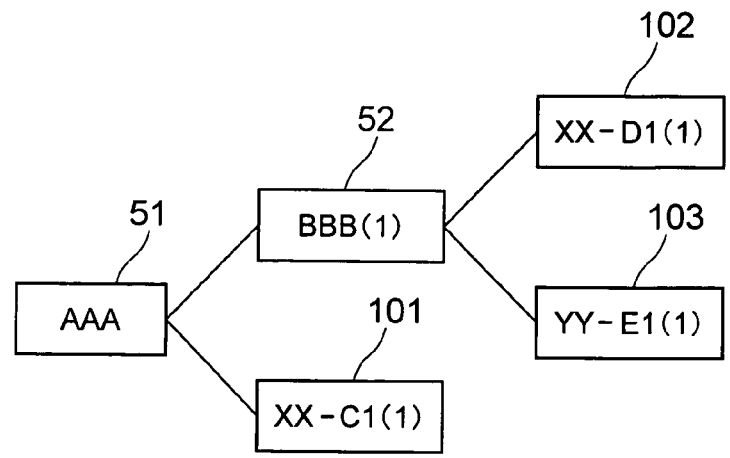
FIG. 10 is a diagram for explaining the state of a self company parts bill at the time that a process 92 ends.

The self company part number "CCC" in node 53 of FIG. 5 is replaced with a part number "XX-C1" in node 101 of FIG. 10, the self company part number "DDD" in node 54 of FIG. 5 is replaced with a part number "XX-D1" in node 102 of FIG. 10 and the self company part number "EEE" in node 55 of FIG. 5 is replaced with a part number "YY-E1" in node 103 of FIG. 10.

In step 93, data stored in the correspondent parts bill storage unit 3 is read to create a correspondent parts bill. Specifically, the PS data and PN data in the correspondent parts bill storage unit 3 explained in connection with FIGS. 6 and 7 are read to obtain a tree structure of parts as shown in FIG. 8.

In step 94, the self company parts bill created in the step 91 and replaced in the step 92 and the correspondent parts bill created in the step 93 are combined. Since, in the step 92, the end of the self company parts bill is replaced with the correspondent part number, the substituted part number is retrieved from the correspondent parts bill and a correspondent part constituent is combined.

Figure 11:
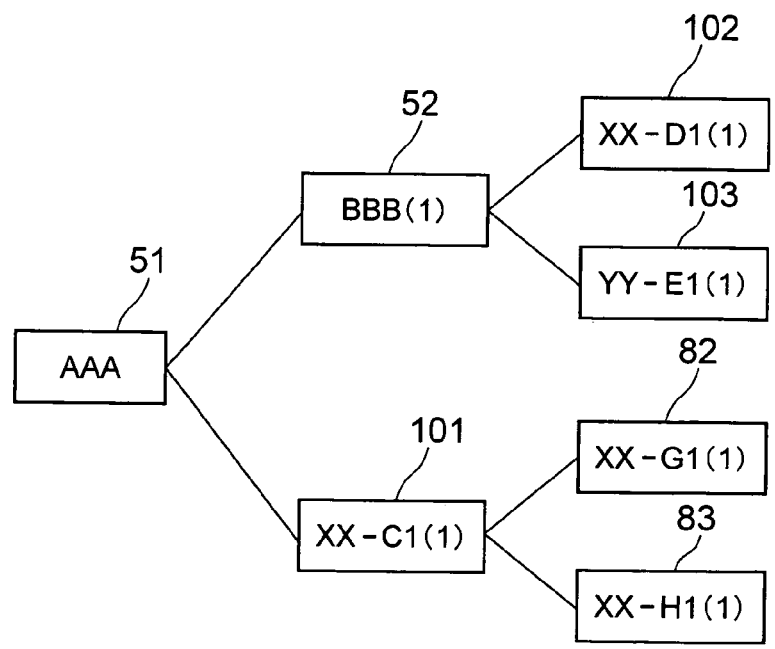
FIG. 11 is a diagram showing an example of a parts bill in which self company and correspondent parts are combined at the time of completion of a process 94.

An example of a parts bill obtained by combining the self company parts and the correspondent parts at the time of completion of the step 94 is shown in FIG. 11. The part "XX-C1" in node 101 of FIG. 10 coincides with the part "XX-C1" in node 81 of FIG. 8 and therefore, the part "XX-C1" in node 101 is combined with child parts 82 "XX-G1" and "XX-H1" of the "XX-C1" in node 81. Thereafter, the parts bill of FIG. 11 is displayed on the display unit.

The above is the flow of the process in the parts bill creation unit 5 in the absence of the representative parts creation unit 4. Thus, on the basis of the correspondence between the self company and correspondent parts numbers stored in the self company/correspondent parts correspondence storing unit 1, the end parts in the self company parts bill are replaced with the correspondent parts numbers to combine the self company parts bill and the correspondent parts bill.

In the above method, operation does well when one part is purchased from only one correspondent but in case identical parts are purchased from a plurality of correspondents and there are a plurality of candidates for the part, any of the candidate parts is chosen for substitution. In this case, unselected parts do not appear on the parts bill. In the example explained in connection with the process of FIG. 9, too, there are a plurality of candidates of D1 of XX company in line 26 and D2 of YY company in line 27 for the self company part number DDD, as shown in FIG. 2 but the D2 of YY company does not appear in the parts bill shown in FIG. 11 obtained as a result of the process.

In the presence of the plurality of candidates, (1) a decision criterion for selecting, for example, the heaviest part is set up and any part is chosen to create a parts bill as shown in FIG. 11 or (2) different parts bills are created in respect of the individual plural candidates, and any of these methods is adopted. An example of the method (2) is shown in FIG. 12. In the figure, reference numerals 121 and 122 designates parts bills in which the self company part is combined with the correspondent part, with the parts bill 121 selecting D1 of XX company in node 123 as a child part of the self company part BBB and the parts bill 122 selecting D2 of YY company in node 124 as a child part of the self company part BBB.

In this example, there is one part for which two candidates exist but in case the number of candidate parts increases, parts bills are created by the number of combinations and the existence of many parts bills for one product is so inconvenient for the user utilizing the parts bills that troublesome handling may possibly be loaded on the user.

Figure 13:
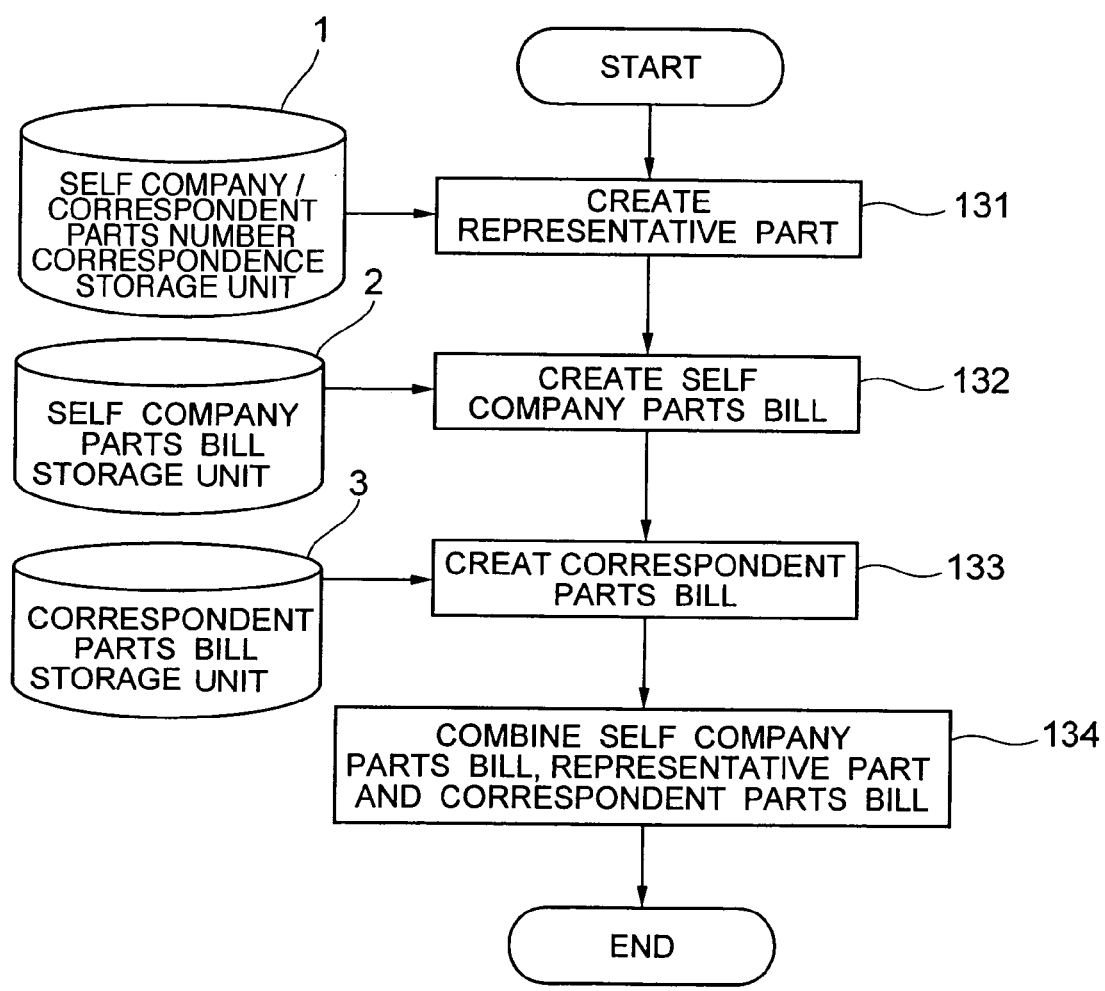
FIG. 13 is a flowchart of a process in the parts bill creation unit 5 when the representative part creation unit 4 exists.

In expectation of the possibility of the existence of a plurality of candidates for a part, the representative part creation unit 4 is constructed by allowing for solution to the above problem and creation of a parts bill containing the plural candidate parts. Illustrated in FIG. 13 is a flowchart of a process executed in the parts bill creation unit 5 when the representative part creation unit 4 is present.

In step 131, a representative part node for connecting a self company part and a correspondent part is created from correspondence data of a parts number stored in the self company/correspondent parts number correspondence storing unit 1.

The representative part creation in the step 131 will be detailed with reference to FIG. 14.

The representative parts creation in the step 131 substitutes the parts number correspondence in the self company/correspondent parts correspondence storing unit 1 as shown in FIG. 2 into the PS data having a self company part number as a parent and a correspondent part number as a child, so that a parts bill in the form of hierarchical structure of the self company and correspondent parts (hereinafter referred to as a representative part/correspondent parts bill) can be created. This step is similar to the step of creating the parts tree structure of FIG. 8 from the PS data of FIG. 7 in the correspondent parts bill storage unit 3. Namely, the parts bill can be created by making a self company part number in column 21 of FIG. 2 correspond to a parent part number in column 72 of FIG. 7, a correspondent company number in column 22 of FIG. 2 correspond to a child part company number in column 73 of FIG. 7 and a correspondent part number in column 23 of FIG. 2 correspond to a child part number in column 74 of FIG. 7.

Figure 14:
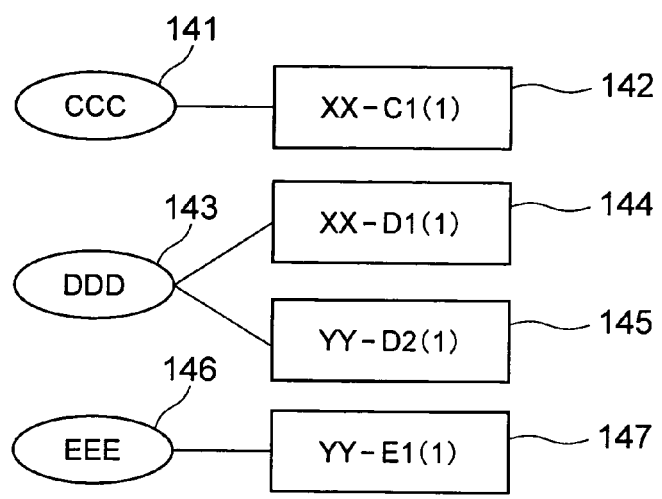
FIG. 14 is a diagram for explaining an example of a representative parts/correspondent parts bill created through a representative part creation process.

The representative part/correspondent parts bill created through the representative part creation step is shown in FIG. 14.

Representative parts are illustrated as CCC in node 141, as DDD in node 143 and as EEE in node 146. In the comparative method explained with reference to FIG. 9, these representative parts expressed by these self company parts numbers are replaced with the correspondent parts number of parts purchased from the correspondent and do not appear in the form of part nodes constituting the parts bill.

Contrary to this, the present invention features that a representative part node indicated by a self company part number is created to connect the self company parts bill and the correspondent parts bill.

It is to be noted that one to one correspondence is made between the self company part number and the correspondent part number and hence every child part can be 1 in number.

In step 132, data stored in the self company parts bill storage unit 2 is read out to create a self company parts bill. This step is identical to the step 91 in FIG. 9.

In step 133, data stored in the correspondent parts bill storage unit 2 is read out to create a correspondent parts bill. This step is identical to the step 93 in FIG. 9.

In step 13.4, the parts bill created in the step 131 to have the hierarchical structure of the representative part and correspondent parts, the self company parts bill created in the step 132 and the correspondent parts bill created in the step 133 are combined. This step will be detailed with reference to FIGS. 5, 8, 14 and 15.

Firstly, the self company parts bill of FIG. 5 is combined with the representative part/correspondent parts bill of FIG. 14.

In this process, a part coincident in part numbers with a part constituting the self company parts bill of FIG. 5 is retrieved from the parts bill of FIG. 14 and combinations are made through the coincident parts.

Figure 15:
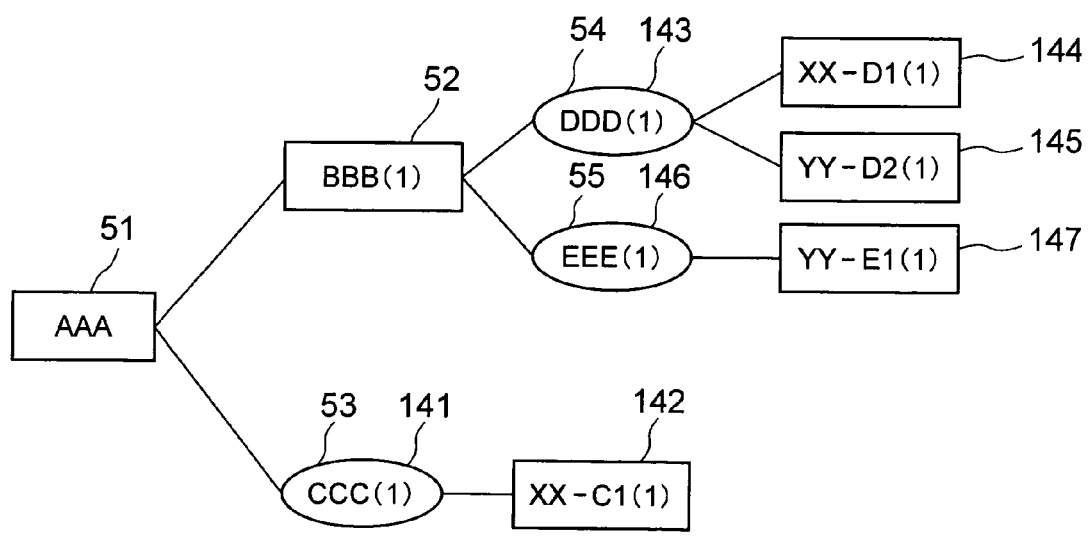
FIG. 15 is a diagram for explaining a parts bill resulting from combination of the self company parts bill and the representative part/correspondent parts bill shown in FIG. 14.

Since CCC in node 53, DDD in node 54 and EEE in node 55 in FIG. 5 coincide in parts numbers with CCC in node 141, DDD in node 142 and EEE in node 143 in FIG. 14, respectively, the parts bills are combined through the medium of these coincident parts, resulting in a parts bill as shown in FIG. 15.

Next, the parts bill of FIG. 15 resulting from the combination of the self company parts bill and the representative part/correspondent parts bill is combined with the correspondent parts bill of FIG. 8. In this process, too, a part being among parts constituting the parts bill of FIG. 15 and a part constituting the correspondent parts bill are used to retrieve parts bill in which parts numbers are coincident with each other and the parts bills are combined through the coincident parts.

Figure 16:
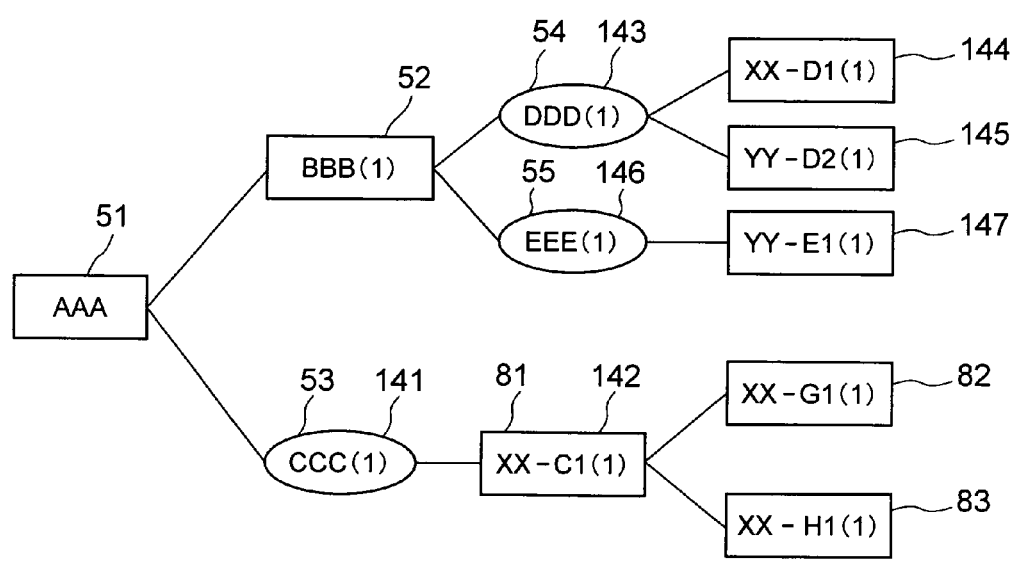
FIG. 16 is a diagram for explaining an example of a parts bill resulting from combination of the self company parts bill, the parts bill as a result of combination of representative part/correspondent parts bill and the correspondent parts bill.

In this example, since XX-C1 in node 142 of FIG. 15 coincides in parts number with XX-C1 in node 81 of FIG. 8, these coincident parts bills are combined to provide a parts bill as shown in FIG. 16. Thereafter, the parts bill of FIG. 16 is displayed on the display unit.

In the foregoing description, the self company parts bill and the representative part/correspondent parts bill are combined in the step 132 to create the combined parts bill and then the combined parts bill is combined with the correspondent parts bill but this sequence is not limitative and may be reversed.

Through the process shown in FIG. 13, the representative part is created between the self company parts bill and the correspondent parts bill, so that the parts bill combining the self company parts bill and the correspondent parts bill can be created. The present invention features the employment of the method according to which when combining the self company parts bill and the correspondent parts bill, a parts bill is not created by substituting a part corresponding to the self company and correspondent parts numbers but is created by adding a self company part number and a correspondent part number in the form of one hierarchy to the parts bill so as to express constituents of a product.

The input unit 9 is for inputting data to the self company/correspondent parts number correspondence storing unit 1, self company parts bill storage unit 2 and correspondent parts bill storage unit 3 and for updating the data. The input unit 9 can be materialized by permitting the user to directly input data through a user interface or by periodically fetching data from another product management system in the company.

The output unit 10 is for outputting a parts bill created by the parts bill creation unit 5 to the screen or a file. Examples of the output are depicted in FIGS. 11, 12 and 16.

The first embodiment according to the present invention has been set forth so far.

This invention has an advantage that as will be seen from comparison with the parts bills of FIGS. 11 and 12 created without using any representative part, a plurality of candidate parts purchased from a plurality of companies can be expressed as constituents of one parts bill. In comparison with the actual constituents of a product, a representative part acting as a dummy node is added in the form of one hierarchy but by circularly encircling only the representative part as shown in FIG. 16, the representative part can be indicated differently from other parts, thereby ensuring that the representative part can be recognized at a glance as being different from an ordinary child part and the purchase from a plurality of companies can be discriminated clearly when a plurality of parts are present in the lower hierarchy than that of the representative part.

In the foregoing description, by taking the fact that for the correspondent parts, the parts number numerating system differs company by company, the parts number is specified by using a combination of the correspondent company number and the correspondent parts number. The self company parts can be handled similarly. In case the numerating system differs in the self company depending on the establishment and department, a part can be specified using a combination of establishment number and department number, thus keeping the above effect of the invention unchanged.

2. Embodiment 2

Figure 17:
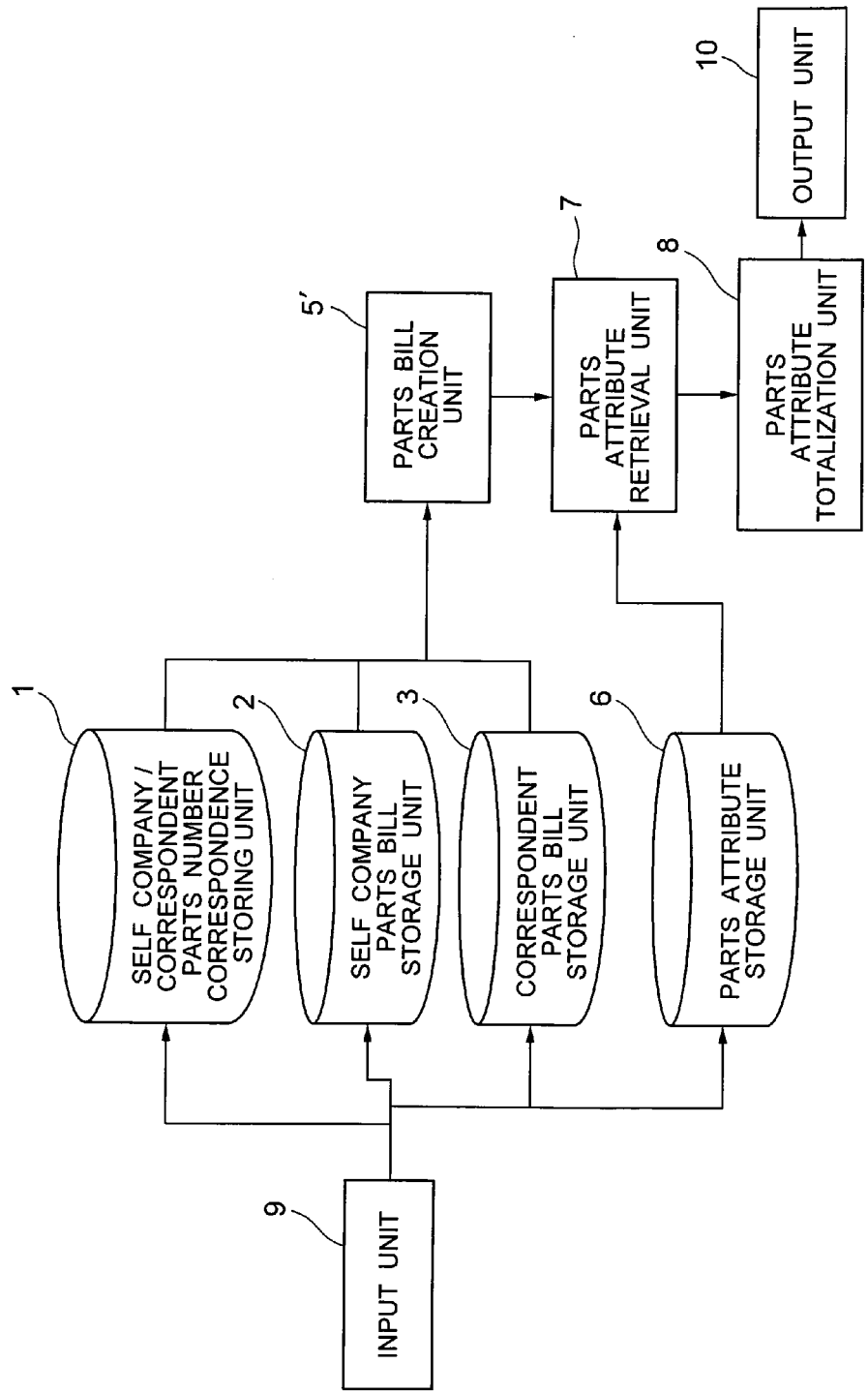
FIG. 17 is a block diagram showing the construction of a second embodiment of the design/manufacture support system according to the invention.

Referring now to FIG. 17, a second embodiment will be described. In comparison with the first embodiment shown in FIG. 1, the representative part creation unit 4 is omitted, the parts bill creation unit 5 is changed to a parts bill creation unit 5' and parts attribute storage unit 6, parts attribute retrieval unit 7 and product attribute totalization (or collection) unit 8 are newly added.

For practicing this construction, the self company parts bill and correspondent parts bill are combined and parts attribute values allotted to correspondent parts are totalized or collected to provide a product attribute value. A description will hereunder be given of the present embodiment by taking totalization of chemical substances, for instance, but the attribute values to be totalized or collected are not limited to the chemical substances and the mass of a product, evaluation of environmental load or evaluation of recyclable properties can be adopted.

The newly added components of the second embodiment will be described in sequential order.

In the construction devoid of the representative part creation unit 4, the parts bill creation unit 5' combines a self company parts bill and a correspondent parts bill to create a parts bill on the basis of the correspondence between parts numbers in the self company/correspondent parts number correspondence storing unit 1, the self company parts bill in the self company parts bill storage unit 2 and the correspondent parts bill in the correspondent parts bill storage unit 3. Thus, the unit 5' is for replacing a self company parts number with a correspondent parts number in accordance with the self company/correspondent parts number correspondence and combining the parts bills.

The flow of a process in the parts bill creation unit 5' is the same as that explained with reference to FIG. 9 in connection with the embodiment 1 and will not be described herein. An example of the thus created parts bill is illustrated in FIG. 12.

The parts attribute storage unit 6 is for storing an attribute value such as the mass of a chemical substance contained in a part.

An example of storage items in the parts attribute storage unit 6 is shown in FIG. 18. Storage items are exemplified in columns 181 to 184 and examples of data to be entered are indicated in lines 185 to 18E.

Correspondent company numbers of parts are indicated in the column 181 and parts numbers are indicated in the column 182 and data pieces in the columns 181 and 182 are combined to specify a part. Indicated in the column 183 is the kind of attribute to be stored. Indicated in the column 184 is the content amount of an attribute specified in the column 183 for a part specified in the columns 181 and 182. For example, it will be seen from the lines 185 and 186 that a part identified by XX company and parts number D1 contains a chemical substance 1 by 5 mg and a chemical substance 2 by 4 mg.

The parts attribute retrieval unit 7 is for executing a process of retrieving attributes belonging to individual parts constituting a parts bill created by the parts bill creation unit 5' and allotting or adding the attributes to corresponding parts.

The process materialized with the parts attribute retrieval unit 7 will be described by making reference to FIGS. 12, 18 and 19.

Illustrated in FIG. 12 are parts bills created by the parts bill creation unit 5 by combining the self company parts bill and the correspondent parts bill, as has already been described. On the basis of individual parts numbers constituting the parts bill, a part for which a combination of entries in columns 181 and 182 stored in the parts attribute storage unit 6 is coincident is retrieved. For example, for XX-D1 in node 123 of FIG. 12, entries of company number and parts number in the line 185 coincide with those in the line 186 in FIG. 18. Accordingly, information pieces of "5 mg content of chemical substance 1" and "4 mg content of chemical substance 2" described in the lines 185 and 186 are added to the XX-D1 in node 123 of FIG. 12.

In this manner, the company number and parts number in FIG. 18 are retrieved by using as key the individual parts numbers constituting the parts bill of FIG. 12 and the attribute kind and attribute amount of coincident data are added to a part. The results of retrieval of attributes corresponding to the individual parts in the parts bill of FIG. 12 from data of FIG. 18 and addition of the attributes are shown in FIG. 24. In the figure, reference numeral 121 designates a parts bill in which XX-D1 in node 123 is selectively adopted from the plurality of candidate parts and 122 designates a parts bill in which YY-D2 in node 124 is adopted. In a parts bill constituting the parts bills 121 and 122, an identical part such as YY-E1 in node 254 is numerated by the same numeral.

The product attribute totalization unit 8 uses the parts bill to totalize attributes added to parts by the parts attribute retrieval unit 7, thereby calculating attribute values of parts in individual hierarchies constituting the parts bill and an attribute value of a product of the highest hierarchy. More particularly, the unit 8 executes a process in which in the parts bill of a product AAA in FIG. 19, intermediate parts DDD in node 54, EEE in node 55 and XX-C1 in node 81, BBB in node 52 and CCC in node 53 are calculated in chemical substance mass from varieties of chemical substance mass added to end parts 144, 145, 147, 82 and 83 and the mass of chemical substances contained in the product AAA in node 51 is eventually calculate.

On this background, the process in the product attribute totalization unit 8 will be described with reference to FIGS. 25 and 26.

Figure 26:
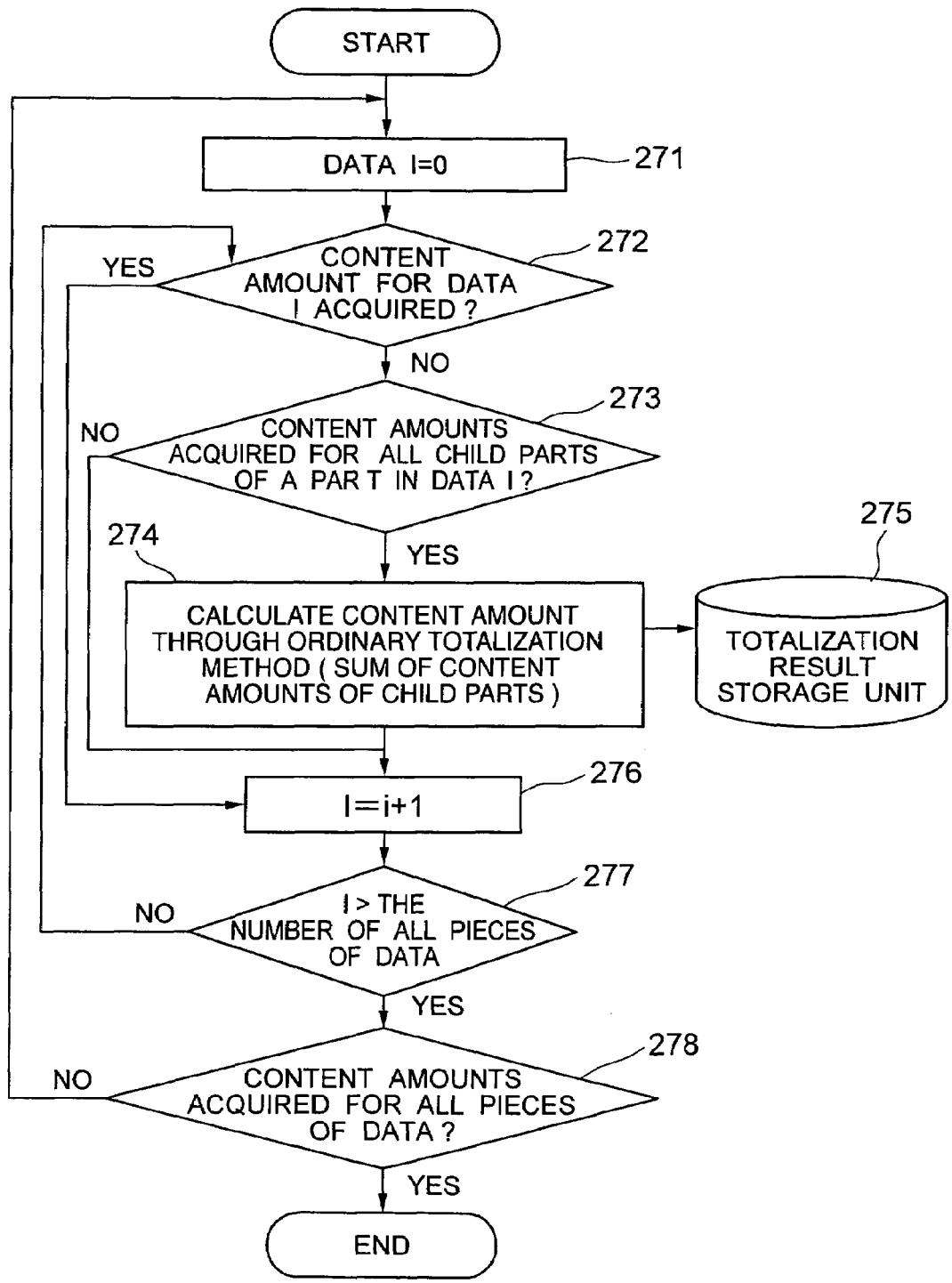
FIG. 26 is a flowchart of a process for totalizing attributes of all parts constituting a product in the product attribute totalization unit.

Illustrated in FIG. 26 is a flowchart of the process in which the product attribute totalization unit 8 totalizes attributes of all parts constituting a product. Illustrated in FIG. 25 is an example of storage items and data in a totalization result storage unit 275 in FIG. 26. The totalization result storage unit 275 is for recording chemical substance content amounts of all parts constituting the product.

Firstly, the totalization result storage unit 275 will be described with reference to FIG. 25. In FIG. 25, an example of items stored in the totalization result storage unit 275 is indicated in columns 261 to 265. Indicated in lines 266 to 26Y is an example of data regions for storing totalization results for the parts bill 121 of the product AAA in FIG. 24 when the candidate parts XX-D1 in the node 123 is used and totalization results for the parts bill 122 of the product AAA in FIG. 24 when the candidate parts YY-D2 in node 124 is used.

The state in FIG. 25 is obtained at the time of starting the product attribute totalization process in FIG. 26.

In the column 261, for discrimination of the parts bills, any of parts bill number 121 when the candidate part XX-D1 is used and parts bill number when the candidate part YY-D2 is used, for example, is entered. The company number is indicated in column 262 and the parts number is indicated in column 263. A part is specified by data in the columns 261 to 263. Indicated in column 264 is the kind of attribute such as the kind of chemical substance. The content amount of a chemical substance specified in the column 264 of a part specified in the columns 261 to 263 is stored in column 265.

Since the totalization process is carried out for all chemical substances in respect of the individual parts constituting the product, the number of data pieces by the totalization result storage unit 275 amounts to (parts number * chemical substance number) in the parts bills. '*' is a multiplication sign. In the case of the product AAA shown in FIG. 24, (parts number 7 * parts bill number 2 * chemical substance number 2=28) in each parts bill is taken. As will be seen from the above, parts and attribute kinds for which totalization results need to be stored are known at the time of totalization process start and therefore, recording areas corresponding to the number of data pieces are assured in advance and the parts bill number in column 261, company number in column 262, parts number in column 263 and attribute kind in column 264 are acquired by consulting the parts bill of FIG. 24 at the time of product attribute totalization process start and inputted as data in advance. Further, for the end parts in nodes 123, 254, 255, 256 and 124 in FIG. 24, content amounts have been acquired through the already described attribute retrieval process and therefore, pieces of information on the content amounts of chemical substances are stored in the lines 266 to 26D and lines 26K to 26S in FIG. 25.

In short, in the process by the product attribute totalization unit 8, the parts bill number in column 261, company number in column 262, parts number in column 263 and attribute kind in column 264 are consulted in sequential order and from a chemical substance content amount of a child part of a part specified in the columns 261, 262 and 263, the chemical substance content amount of the part is calculated and recorded in the column 265.

The flow of the process in the product attribute totalization unit 8 will be described with reference to FIG. 26.

In step 271, a counter I for data is initialized to 0. With the counter I, data pieces in the totalization result storage unit 275 are consulted sequentially.

In step 272, it is decided whether a content amount in column 265 of an I-th data piece has already been acquired and entered. If acquired, no process is needed for this data piece and the program proceeds to step 276 in which the counter is incremented by 1 and then to a process of the next data. If not acquired, the program proceeds to step 273.

In the example of FIG. 25, pieces of data of the content amount in column 265 are entered in lines 266 to 26D and hence, in column 265, the content quantities are entered in lines 266 to 26D and in response to the determination in the step 272, the program proceeds to deal with data in line 26E.

In step 273, it is decided whether the content amounts are acquired for all child parts of a part corresponding to the I-th data. In the example of FIG. 25, it can be known from the parts bill of FIG. 24 that a part in line 26E represented by C1 of XX company is linked to child parts XX-G1 and XX-H1. Further, in column 264, a chemical substance 1 is entered in line 26E and hence it is decided whether content amounts of chemical substance 1 of the XX-G1 and XX-H1 have been acquired. Since the chemical substance 1 of XX-G1 and that of XX-H1 are described in lines 26A and 26C, respectively, demonstrating that both the content amounts have been acquired, the decision in the step 273 is yes and the program proceeds to step 274. If any of the two content amounts has not been acquired, the processing of the data is canceled and the program proceeds to step 276 in which the counter for data is advanced by 1.

In the step 274, from the content amount and the parts number of child parts of a part corresponding to the data, the content amount in column 214 is calculated in connection with the data I and a calculated content amount is stored in the totalization result storage unit 275.

Figure 19:
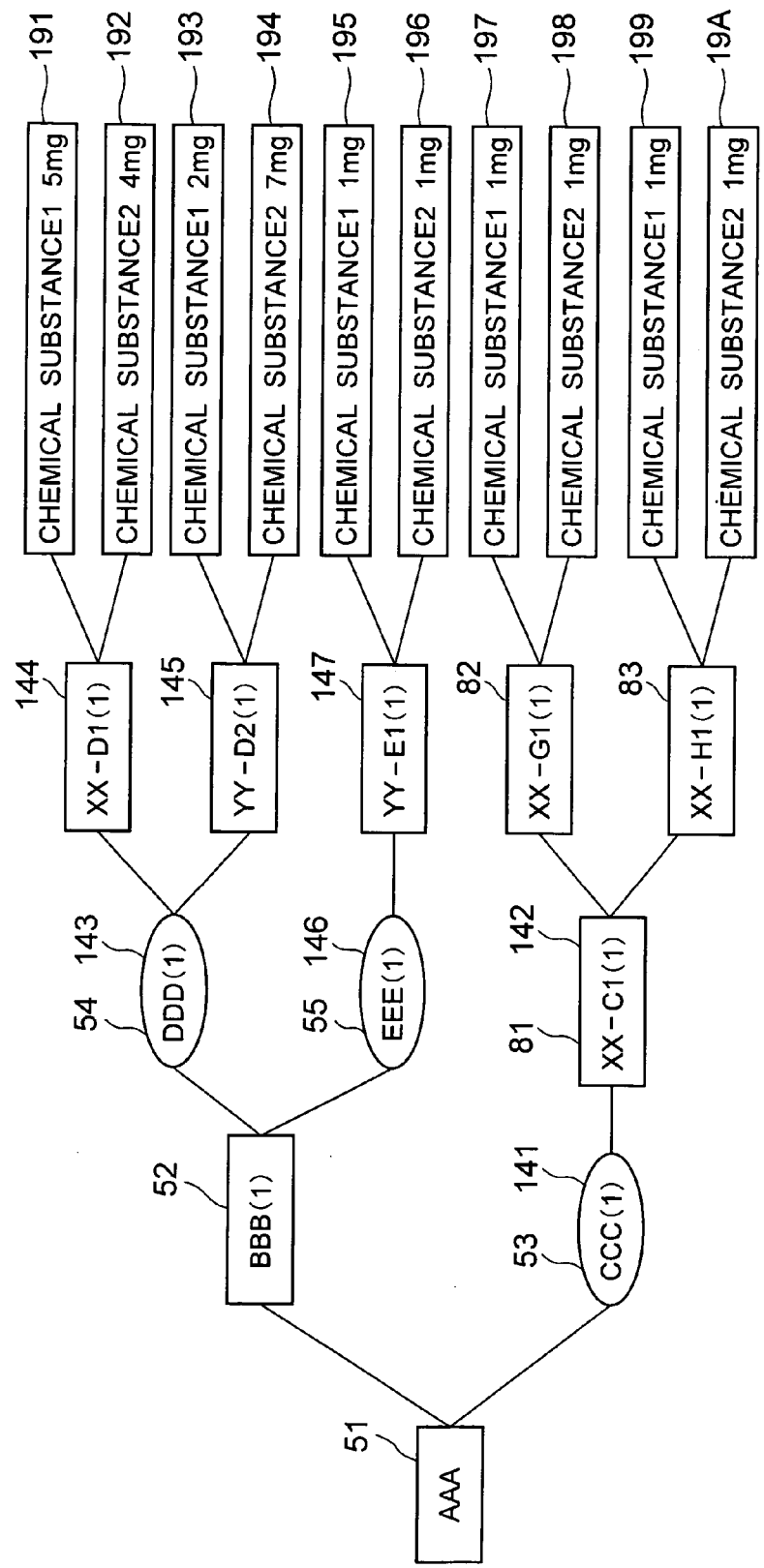
FIG. 19 is a diagram for explaining that attributes corresponding to individuals parts created by the parts bill creation unit are retrieved from data of the parts attribute storage unit 6 to provide found out results.

In the example in line 26E of FIG. 25, a parts XX-C1 is known from FIG. 19 as having child parts XX-C1 and XX-H1 each of which is 1 in number and both the child parts have a content amount of 1 mg of chemical substance 1, resulting in Content amount of chemical substance 1 in part XX-C1=1*1+1*1=2 mg, and in the column 265 of totalization result storage unit 275, a value of "2 mg" is entered in line 26E.

The totalization result storage unit as designated by 275 in the flowchart has already been described and will not be explained in this phase.

In step 276, the counter I for data is advanced by 1 to a step of processing the next data.

In step 277, it is decided whether the counter I for data has exceeded the number of all pieces in the totalization result storage unit 275. If exceeded, the program proceeds to step 278. If not exceeded proving that unprocessed data is present, the program returns to the step 272.

In step 278, it is decided whether the content amounts of all data pieces in the column 214 of the totalization result storage unit 275 have been acquired. If acquired, it is determined that the content amounts of all chemical substances for all of the parts can be obtained and the process of FIG. 26 ends. If not acquired, the presence of data for which the content amounts are not calculated is determined and the program is returned to the step 271 and the steps are repeated starting from the initial data.

The state of the totalization result storage unit 275 at the time of completion of the process by the product attribute totalization unit 8 is shown in FIG. 27 and an example in which chemical substance content amounts as a result of totalization are add to the parts bill is shown in FIG. 28. For the parts bill 121 in the case of adoption of XX-D1 in node 123, the product AAA in node 251 is determined to contain the chemical substances 1 and 2 by content amounts of 8 mg and 7 mg, respectively. For the parts bill 122 in the case of adoption of YY-D2 in node 124, the product AAA in node 251 is determined to contain the chemical substances 1 and 2 by content amounts of 5 mg and 10 mg, respectively.

In this manner, with the construction of embodiment 2, a parts bill can be created by combining the self company and correspondent parts bills and from the attribute value of parts such as chemical substance mass added to the correspondent parts, the attributes of a product constituted by the parts can be totalized.

In the above example, the product containing one of plural candidate parts has been exemplified. As is clear from this, in the case of a product lacking a plurality of candidate parts, the chemical substances of the product can be totalized through the method of embodiment 2. But, in the presence of a plurality of candidate parts, to deal with a chemical substance 1 in nodes 291 and 297 and a chemical substance 2 in nodes 292 and 298 shown in FIG. 28, the totalization result is calculated in plural ways.

In totalizing chemical substances of a product, for the purpose of meeting the regulation such as, RoHS, compliance with the regulation must be exhibited even when the product is so manufactured that the content chemical amount is maximized. Therefore, in the case of existence of a plurality of candidate parts, totalization must be done by taking parts for which the content amount is maximized in respect of individual chemical substances.

In the example of FIG. 28, for the parts bill 121 in which of the plural candidate parts, XX-D1 in the node 123 is used, the chemical substance 1 is 8 mg (mark 291) and the chemical substance 2 is 7 mg (mark 292) whereas for the parts bill 122 in which YY-D2 in the node 124 is used, the chemical substance 1 is 5 mg and the chemical substance 2 is 10 mg. Therefore, in order to set the maximum content amount of every chemical substance in compliance with the regulation such as RoHS, the maximum content amount is determined by using an attribute value maximum content amount calculation unit (not shown) which further compares the parts bills 121 and 122 and determines the maximum content amount of every chemical substance.

In the example of FIG. 28, of one set of plural candidate parts, the number of candidate parts is 2 and hence the number of parts bills is 2 but in case more plural candidate parts exist, parts bills must be created by the number of combinations of individual candidates and be evaluated. In addition, for the designer consulting the parts bills as a result of totalization to apply feedback to design, comparison of many parts bills by consulting the difference therebetween is difficult job.

An embodiment capable of determining the maximum value in respect of individual chemical substances in a product linked to a plurality of candidate parts to comply with the chemical substance content regulation and enabling a single parts bill to give comparative evaluation results can be practiced by embodiment 3 to be described hereunder.

3. Embodiment 3

Figure 29:
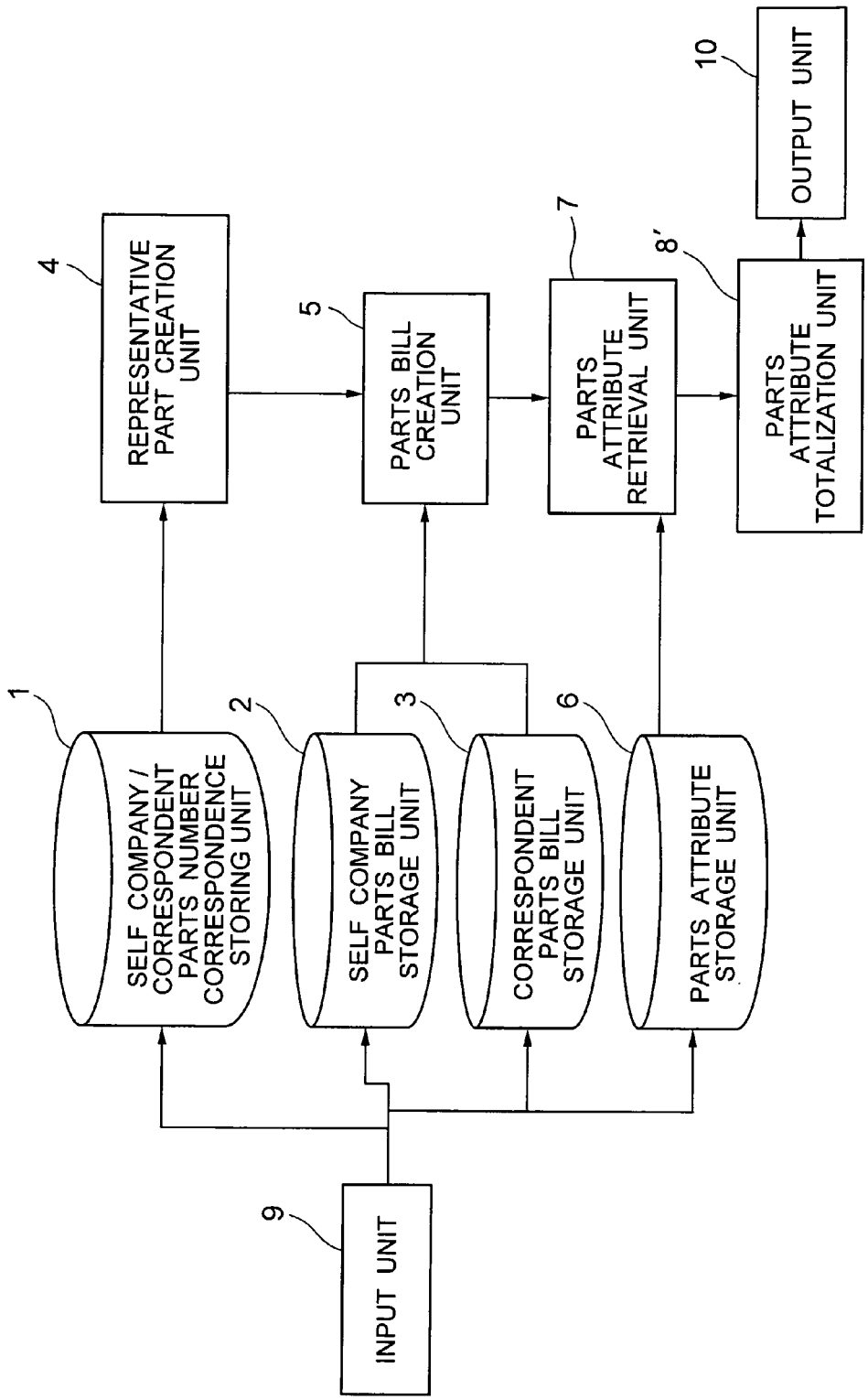
FIG. 29 is a block diagram showing the construction of a third embodiment of the design/manufacture support system according to the invention.

Reference is now made to FIG. 29 to describe a third embodiment. In comparison with the second embodiment shown in FIG. 2, a representative part creation unit 4 is newly added, the parts bill creation unit 5' is changed to a parts bill creation unit 5 and the product attribute totalization unit 8 is changed to a product attribute creation unit 8'.

The parts bill creation unit 5 differs from the parts bill creation unit 5' in that it creates a parts bill by using a representative part created by the representative part creation unit 4.

The product attribute totalization unit 8' differs from the product attribute totalization unit 8 in a totalization method in such a manner that when totalizing attribute values of a representative part, taking of the maximum value of attributes of a child part such as determination of a representative of the child part is set the representative part.

To materialize this construction, a parts bill created in the first embodiment is used and attribute values of a product are totalized from attribute values of parts constituting the parts bill. The present embodiment differs from the second embodiment in that a parts bill is created by creating a representative part and attribute values are totalized by using the created parts bill. In describing the present embodiment hereunder, totalization of chemical substances will be taken as an example but attribute values to be totalized may be mass of a product, evaluation of environmental loads or evaluation of recyclable properties.

The carrying-out form ranging from creating a representative parts bill from the correspondence between parts numbers in the self company/correspondent parts number correspondence storing unit 1 by means of the representative part creation unit 4 to creating a parts bill from the created representative part, self company parts storage unit 2 and correspondent parts storage unit 3 by means of the parts bill creation unit 5 has already been described in connection with the first embodiment. An example of a parts bill created with the parts bill creation unit 5 in the third embodiment is illustrated in FIG. 16.

The parts attribute storage unit 6 and parts attribute retrieval unit 7 in the third embodiment are the same as those described in connection with the second embodiment. The parts bill of FIG. 16 created by the parts bill creation unit 5 is added with attribute values of parts attribute storage unit 6 of FIG. 18 by means of the parts attribute retrieval unit 7, providing-the result as shown in FIG. 19.

The product attribute totalization unit 8' is for totalizing the attribute values added to the parts by means of the parts attribute retrieval unit 7 and calculating attributes of parts of individual hierarchies constituting the parts bill and of a product of the highest hierarchy. This unit 8' differs in function from the product attribute totalization unit 8 in that the method for totalization of attributes of the representative part is changed to the method for totalization of attributes of other general parts.

A process in the product attribute totalization unit 8' will be described with reference to FIGS. 20 and 21.

Figure 20:
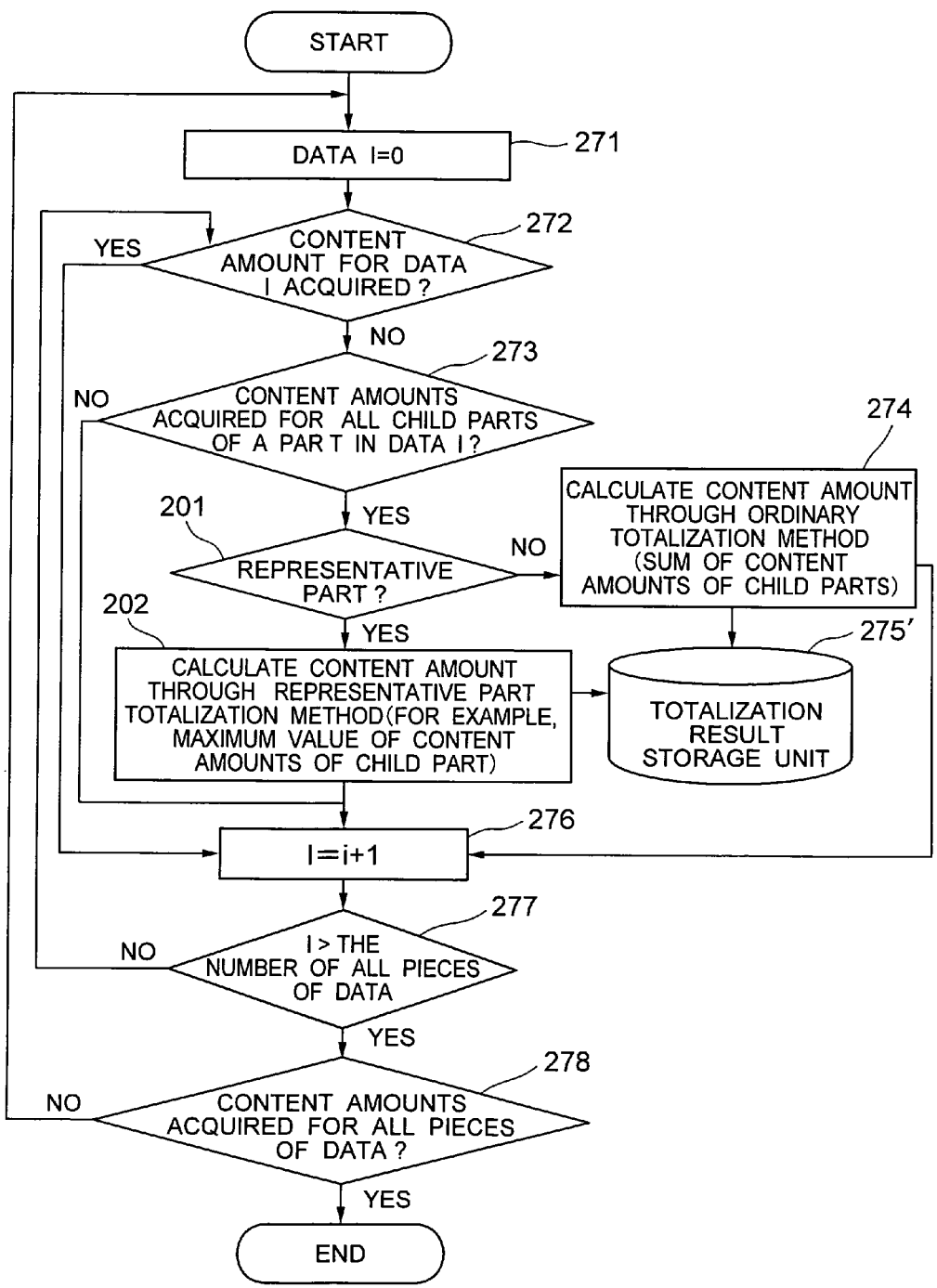
FIG. 20 is a flowchart of a process for totalizing attributes of all parts constituting a product by means of the product attribute totalization unit 8.

Illustrated in FIG. 20 is a flowchart of a process for totalizing attributes of all parts constituting a product by means of the product attribute totalization unit 8'. An example of storage items and data in a totalization result storage unit 275' of FIG. 20 is shown in FIG. 21. The totalization result storage unit 275' is for recording chemical substance content amounts of all parts constituting the product.

For convenience of explanation, prior to giving a description of FIG. 20, the totalization result storage unit 275' will be described by making reference to FIG. 21. In FIG. 21, an example of items to be stored in the totalization result storage unit 275' are indicated in columns 211 to 215. Data regions for storing totalization results for the parts bill of product AAA in FIG. 19 are exemplified in lines 216 to 21R.

The totalization result storage unit 275' differs from the totalization result storage unit 275 in the second embodiment in that an item of representative part flag is added in the column 215. In addition, since distinction between parts bills is unneeded, the item of parts bill in column 261 in FIG. 25 is omitted.

Illustrated in FIG. 21 is the state at the time of start of the product attribute totalization process in FIG. 20.

Indicated in the columns 211 and 212 are company number of parts and parts number, respectively. A part is specified by the items in the columns 211 and 212. The kind of attribute is indicated in the column 213. A content amount of a chemical substance specified by the item in column 213 of a part specified by the items in columns 211 and 212 is stored in the column 214. In the column 215, a flag for identifying whether the part is a representative part or not is stored, the flag being 1 for the part in question being a representative part and 0 for that part not being a representative part.

The totalization process is carried out for all chemical substances in respect of all of individual parts constituting a product and therefore, the number of pieces of data in the totalization result storage unit 275' amounts to (parts number * chemical substance number). In the case of the product AAA shown in FIG. 19, (parts number 11 * chemical substances 2=22) stands. In this manner, the part and attribute kind for which storage of totalization results is necessary are known at the start time point of totalization process and therefore, it is assumed that record regions corresponding in number to the number of data pieces are assured and the company number in column 211, parts number in column 212, attribute kind in column 213 and representative part flag in column 215 are acquired from the information of the parts bill in FIG. 19 at the time of start of product attribute totalization process by consulting the parts bill of FIG. 19 so that the data may be inputted or entered in advance. And also, for the end parts 144, 145, 147, 82 and 83 in FIG. 19, the contents amounts have already been acquired through the already described attribute retrieval process and therefore, the information of the content amounts of chemical substances are stored in advance in lines 216 to 21F in FIG. 21.

In the process by the product attribute totalization unit 8', the company number in column 211, parts number in column 212 and attribute kind in column 213 are consulted sequentially starting from the, initial state shown in FIG. 21, so that from a chemical substance content amount of a child part of a part specified by the items in columns 211 and 212, a chemical substance content amount of that part is calculated and stored in the column 214. As compared to the flow of the process in the product attribute totalization unit 8 in FIG. 26, this process is added with decision in step 201 and representative part attribute value calculation in step 202.

By making reference to FIG. 20, the flow of a process in the product attribute totalization unit 8' will be described.

In step 271, the counter I for data is initialized to 0. Pieces of data in the totalization result storage unit 275' are consulted sequentially by means of the counter I.

In step 272, it is decided whether the content amount in column 214 has been acquired for an I-th data piece and its value has been entered. If acquired, no process is needed for this data piece and the program proceeds to step 276 in which the counter I is advanced by 1 and the next data piece is ready to be processed. If not acquired, the program proceeds to step 273.

In the example of FIG. 21, data pieces of content amount in column 214 are entered in the lines 216 to 21F and consequently, a data piece in line 21G is reached through the step 272.

In step 273, it is decided whether the content amounts have been acquired for all child parts of the part corresponding to the first data piece. In the example of FIG. 21, a part in line 21G represented by C1 of XX company is known from the parts bill of FIG. 19 as being linked to child parts XX-G1 and XX-H1. Then, since the attribute kind in column 213 for the part in line 21G is chemical substance 1, it may be decided whether the content amounts of chemical substance 1 of the XX-G1 and XX-H1 have been acquired. For both the chemical substances 1 of XX-G1 and XX-H1, the content amounts are described in lines 21C and 21E, proving that the content amounts have been acquired for both the child parts, and decision in the step 273 is "yes" and the program proceeds to step 201. If any of the content amounts of the two child parts have not been acquired, the process for that data piece is canceled and the program proceeds to the step 276 in which the counter I for data is advanced by 1.

In the step 201, the I-th data piece in course of process is decided as to whether to be data concerning a representative part. In this decision, data for which the representative part flag in column 215 of FIG. 21 is 0 is determined as not being for representative part and the program proceeds to step 274. Data for which the representative flag is 1 is determined as being for representative part and program proceeds to step 202.

Because of the data piece being for ordinary parts other than the representative part, the content amount in column 214 of data piece I is calculated in the step 274 from the content amounts and number of parts of child parts linked to the part corresponding to the data piece through the ordinary totalization method and calculated content amounts are inputted to the totalization result storage unit 275'.

In the example in line 21G of FIG. 21, child parts of the part XX-C1 are known from FIG. 19 as being XX-G1 and XX-H1 and each of the child parts is 1 in number and has the chemical substance 1 by a content amount of 1 mg. Therefore, Content amount of chemical substance 1 of part XX-C1=1*1+1*1=2 mg stands and the value of "2mg" is inputted to line 21G in column 214 of the totalization result storage unit 275'.

If the data piece is for a representative part, the content amount is calculated in the step 202 through the representative part totalization method. When the data piece is determined as being for the representative part in the step 201, the content amounts of child parts are not summed but the maximum value of content amounts of child parts is taken.

Taking a data piece in line 21K, for instance, the content amount of chemical substance 1 of part DDD is concerned and because of the representative part flag being 1, calculation is carried out in the step 202 through the representative part totalization method. From FIG. 19, child parts of the part DDD are XX-D1 and YY-D2. As will be seen from FIG. 21, the XX-D1 contains the chemical substance 1 by 5 mg in line 216 and the YY-D2 contains the chemical substance 1 by 2 mg in line 218, so that the value 5 mg in line 216 is considered as the maximum value of them and is adopted as the content amount of chemical substance 1 of the part DDD and 5 mg is inputted in line 21K in the item "content amount" in column 214.

Similarly, in a data piece in line 21L, the content amount of chemical substance 2 of the part DDD is concerned and because child parts XX-D1 and YY-D2 contain the chemical substance 2 by 4 mg and 7 mg content amounts, respectively, as indicated in lines 217 and 219 in FIG. 21, so that the value 7 mg in line 219 is considered as the maximum value and adopted as the content amount of chemical substance 2 of the part DDD and 7 mg is inputted in line 21J in the item "content amount" in column 214.

As described above, even for the same representative-part DDD, the value for XX-D1 can be adopted as a representative value in respect of the chemical substance 1 and the value for YY-D2 can be adopted as a representative value in respect of the chemical substance 2.

The totalization result storage unit as designated by 275' has already been described in connection with FIG. 21 and will not be explained herein.

In the step 276, the counter I for data is advanced by 1 to handle data pieces to be processed subsequently.

In step 277, it is decided whether the counter I for data exceeds the number of all data pieces in the totalization result storage unit 275'. If exceeded, the program proceeds to a step 278. If not exceeded, the presence of untreated data is determined and the program returns to the step 272.

In the step 278, it is decided whether the content amount in column 214 is acquired for all data pieces in the totalization result storage unit 275'. If acquired, demonstrating that the content amounts of all chemical substances of all parts are determined, the process of FIG. 20 ends. If not acquired, the presence of data for which the content amount is not calculated is determined and the program is returned to the step 271, so that the process is repeated starting from the initial data.

Figure 22:
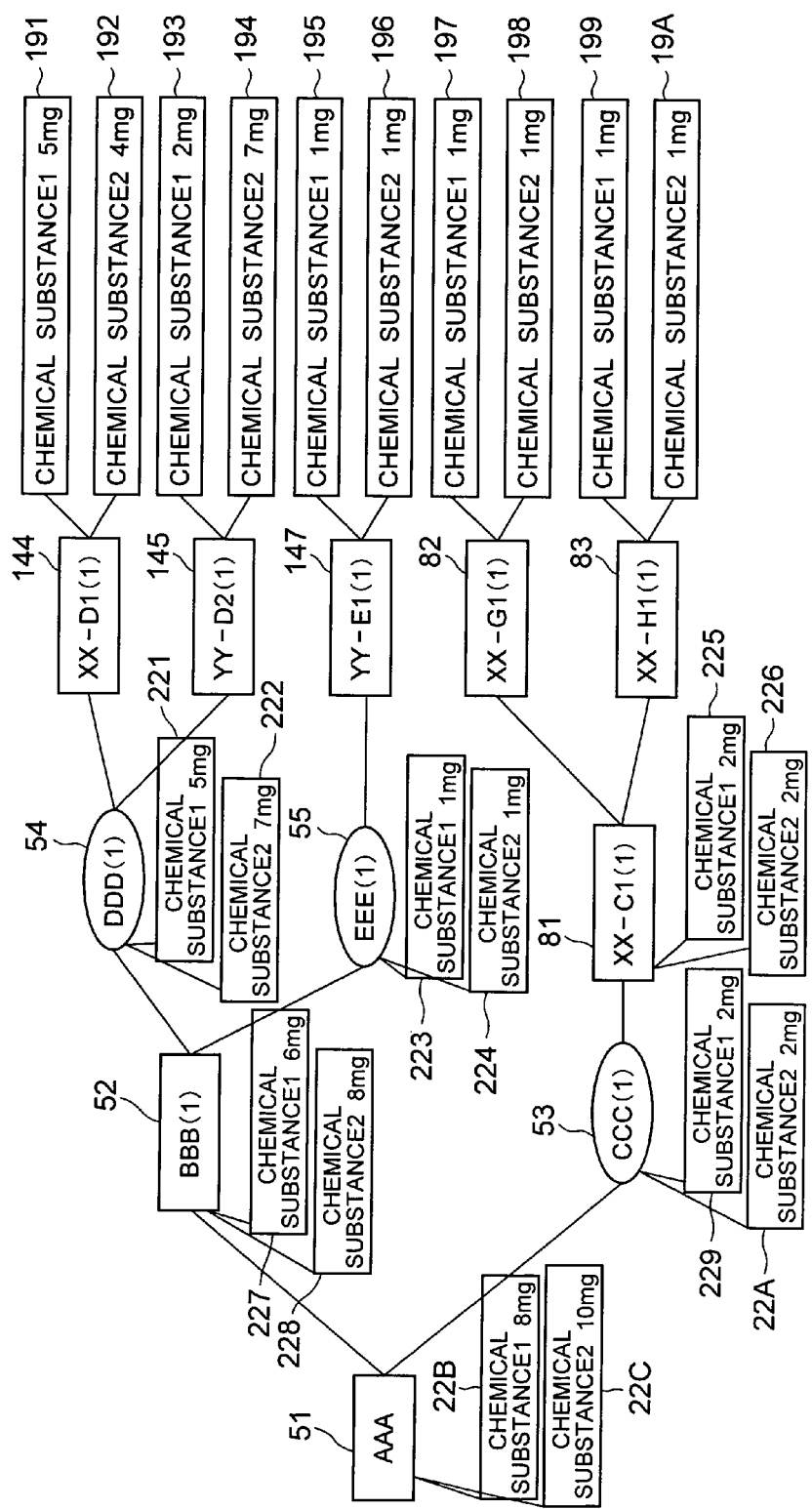
FIG. 22 is a diagram for explaining an example in which chemical substance content amounts as a result of totalization by means of the product attribute totalization unit 8 are added to the parts bill and displayed.

The state of the totalization result storage unit 275' at the time of completion of the above process in the product attribute totalization unit 8' is shown in FIG. 24 and an example where chemical substance content amounts as a result of totalization are described in a parts bill is illustrated in FIG. 22. In the figure, CCC in node 53, DDD in node 54 and EEE in node 55 are representative parts and for them, the chemical substance content amounts are calculated through the representative part totalization method and therefore, the maximum value of content amounts of child parts is calculated as the content amount of the representative part. Consequently, even if the product AAA in node 51 contains a plurality of candidate parts having 8 mg of chemical substance 1 and 10 mg of chemical substance 2, the maximum content amount can be calculated in respect of the individual chemical substances.

In this manner, by adding a representative part node at higher hierarchy than a part for which a plurality of candidates can exist and totalizing the maximum value of attribute values of child parts in course of totalization of representative part node, the maximum content amount can be determined in respect of plural kinds of chemical substances even in the presence of the plural candidate parts.

Further, according to the invention, a plurality of candidate parts can be arrayed and indicated in a single parts bill (144 and 145 in FIG. 22). Especially, when the parts bill is used for evaluation of content chemical substances, chemical substance compositions of a plurality of candidates can be compared with one another to exhibit the difference among them, thus effectively contributing to feedback to design. Taking the example of FIG. 22, for instance, in connection with plural candidates XX-D1 in node 144 and YY-D2 in node 145, it is clear that the content amount of chemical substance 1 is larger for the XX-D1 and the content amount of chemical substance 2 is larger for the YY-D2, so that as can be readable from indications in the parts bill, a content amount of 5 mg of chemical substance 1 (designated by reference numeral 221) and a content amount of 7 mg of chemical substance 2 (designated by reference numeral 222) are adopted as representative values for a representative part DDD in node 54.

In displaying a parts bill containing a representative part node, a display method may be employed according to which for discrimination from general parts, the display color is changed or the shape encircling a part number is changed as shown in FIG. 22 to thereby discriminate the representative part from another kind of parts.

Further, when making the use of the parts bill created according to the invention for design and manufacture, a method may be employed according to which by giving a display up to the representative part node without displaying lower parts hierarchies, an incongruent sense due to the one hierarchy of representative part added in comparison with the practical product parts structure can be eliminated.

In the embodiments 1, 2 and 3 of the present invention set forth so far, it is demonstrated that a self company parts bill can be combined with a correspondent parts bill to create a parts bill and an attribute of a product can be evaluated.

Next, a fourth embodiment directed to realization of a product chemical substance totalization method according to teachings of the invention and an example of screen for display of output results of the totalization will be described.

4. Embodiment 4

In the fourth embodiment, totalization is carried out for individual parts of a parts bill in a unit of substance group/chemical substance which differs with different regulations and report destination companies and the results of totalization are displayed.

There is a possibility that a chemical substance differs in name and substance code depending on regulations and a company administering the chemical substance. Further, a plurality of substances are classified into substance groups and administered in a unit of substance group as in an example where substances "lead" and "lead oxide", for instance, are classified into a substance group "lead and its compound". In the present embodiment, how to establish the totalization and the display of chemical substances and substance groups in accordance with various regulations and various types of administrative sorting classification adopted in individual report destination companies and its example will be described as below.

Figure 30:
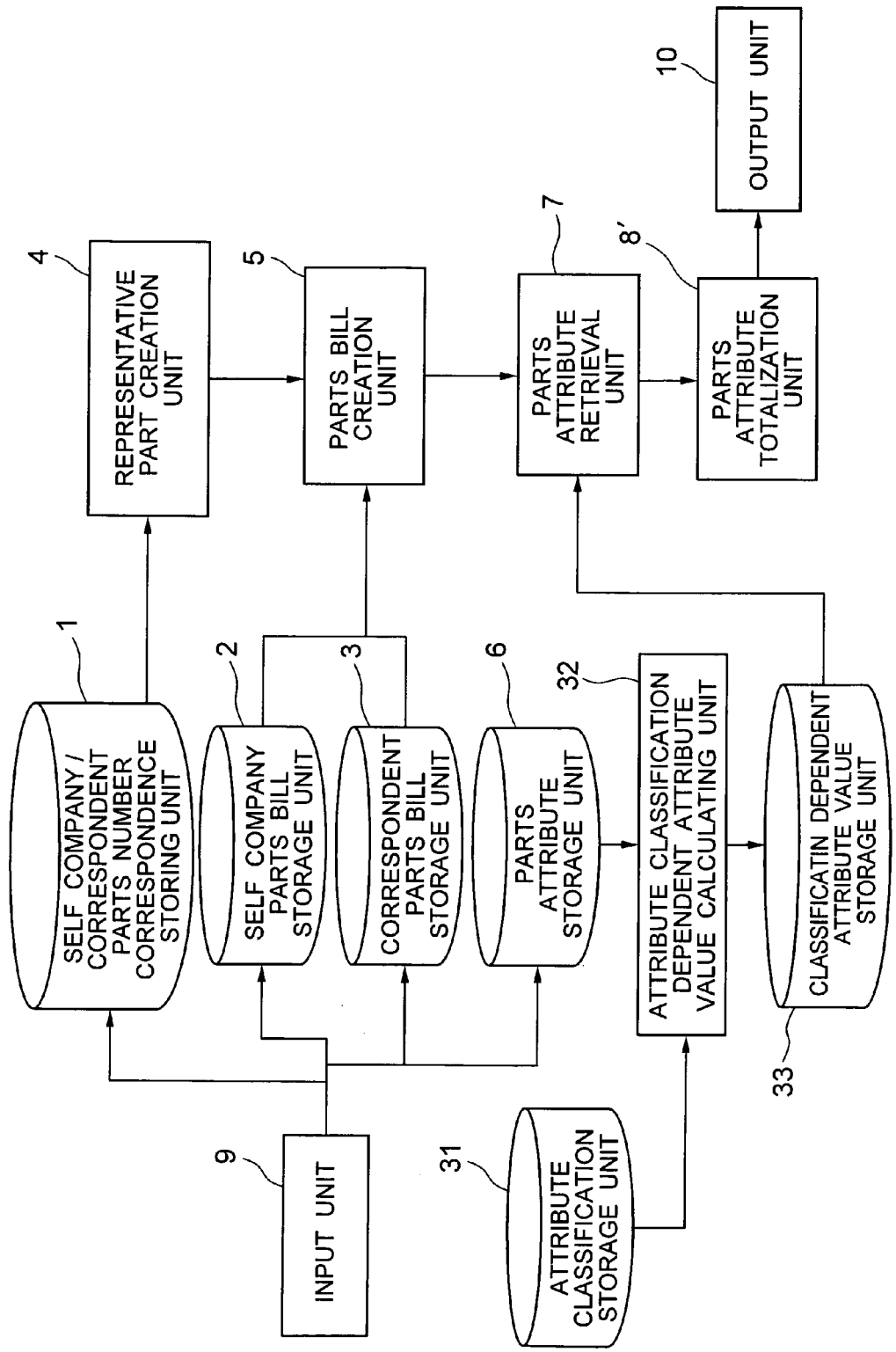
FIG. 30 is a block diagram showing the construction of a fourth embodiment of the design/manufacture support system according to the invention.

The fourth embodiment of the invention will be described with reference to FIG. 30. In this example, new components are added to the construction of the third embodiment but they may be added to the second embodiment.

As compared to the second embodiment, new additional components are attribute classification storage unit 31, attribute classification dependent attribute value calculating unit 32 and classification dependent attribute value storage unit 33.

When there is an attribute classification corresponding to an attribute (a substance group concerning chemical substances) or a different substance code system or name in accordance with regulations or an administrative sorting of a report destination, the attribute classification storage unit 31 stores the correspondence among these factors. In explaining by way of chemical substances, the attribute classification storage unit stores classification of either a regulation/report destination dependent substance code corresponding to a chemical substance or a regulation/report destination dependent substance group corresponding to the chemical substance.

Concrete storage items are exemplified in FIGS. 31 and 32. Indicated in FIG. 31 are attribute generic classification (322), attribute species classification (323) and conversion coefficient (324) which correspond to attribute (321). More specifically, as an example, the attribute generic classification is "regulation/report destination" and the attribute species classification is "substance group". When classifying a substance into a substance group, the conversion coefficient in column 324 indicates a conversion coefficient necessary for converting the mass of a substance into the mass in terms of the substance group. Examples of pieces of data to be stored or entered are indicated in lines 325 to 32A in the figure. For example, in lines 325 and 329, even the same "substance 1" is classified into different substance groups "A1" and "lead" in accordance with entries "OWN" and "RoHS" in the classification of regulation/report destination. In this manner, the classification of substance group possibly differs depending on the regulation/report destination in the chemical substance administration and therefore, the correspondence among these factors is stored in a format as shown in FIG. 31, for instance.

In an example shown in FIG. 32, there are attribute generic classification (332), corresponding attribute (333) and conversion coefficient (334) which correspond to attribute (331). More specifically, in an example as parenthesized in the figure, the attribute generic classification is "regulation/report destination" and the corresponding attribute is "regulation/report destination substance". When converting a chemical substance into a corresponding substance mass, an entry in the conversion coefficient (334) is used and typically, for different regulations and report destinations, the chemical substance is often handled as being unchanged with the only exception that its name or code is changed and therefore the conversion coefficient is often set to 1 and can be omitted. In the figure, examples of data pieces to be stored or entered are indicated in lines 335 to 337. In an example, in the line 335, "substance 1" is "lead oxide" according to the regulation/report destination substance classification for which "RoHS" is entered. As will be seen from above, in the chemical substance administration, code or name of a chemical substance sometimes differs depending on the regulation/report destination and therefore, the correspondence is stored in a format shown in, for example, FIG. 32.

Next, the attribute classification dependent attribute value calculating unit 32 and classification dependent attribute value storage unit 33 will be described. Storage items in the classification dependent attribute value storage unit 33 are exemplified in FIG. 33. In this example, for individual parts, the substance group content amounts in respect of each regulation/report destination are calculated from data in the parts attribute storage unit 6 shown in FIG. 18 and data in the attribute classification storage unit 31 shown in FIG. 31 and stored. Company name of parts is itemized in column 341 and parts number is itemized in column 342. Itemized in column 343 is regulation/report destination of substance group and in column 344 is substance group. The content amount of a regulation/report destination substance group, which is specified by items in columns 343 and 344 and which corresponds to a part specified by company number in column 341 and parts number in column 342, is calculated and stored in column 345.

Figure 34:
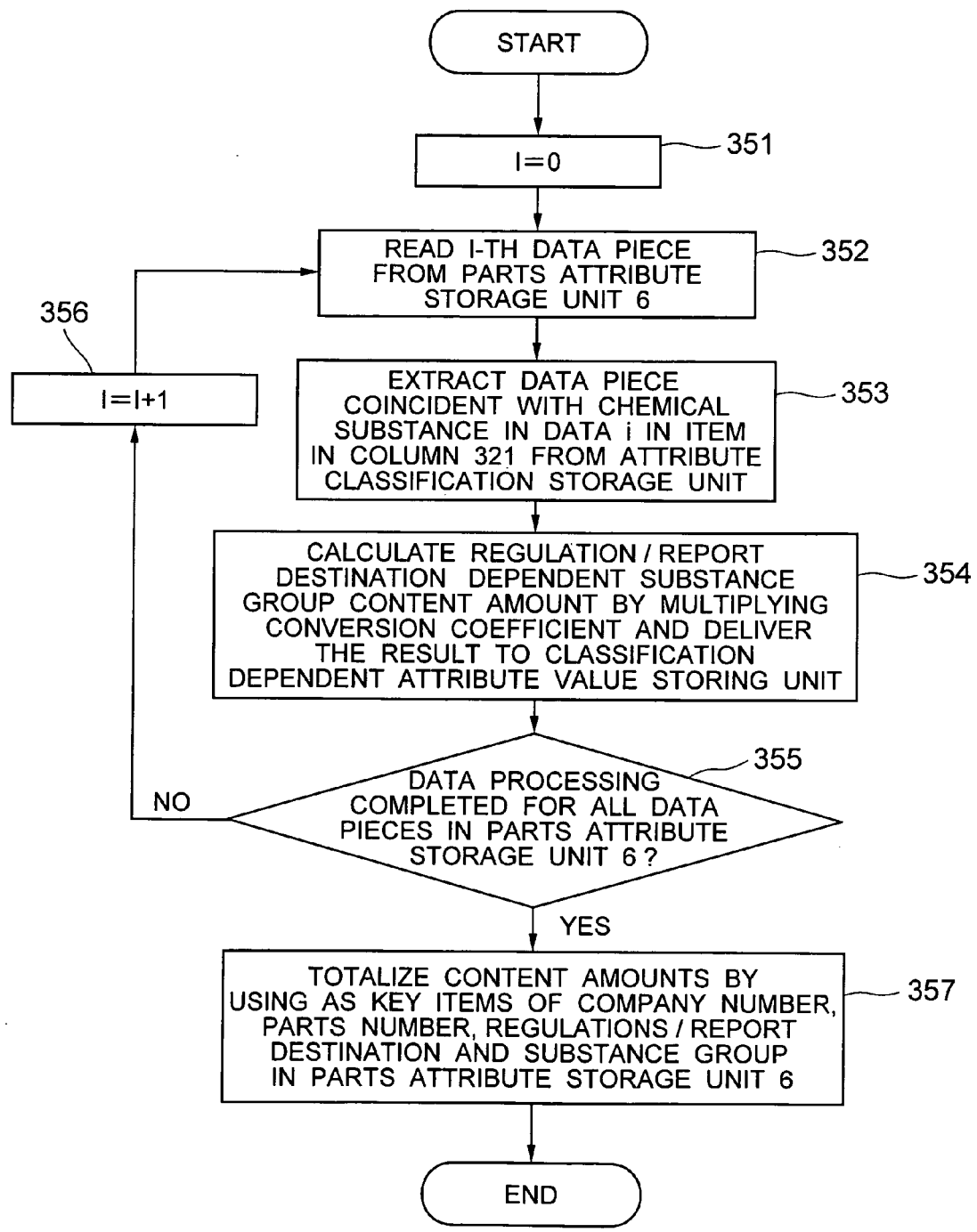
FIG. 34 is a flowchart for explaining a process in the attribute classification dependent attribute value storage unit.

The process in the attribute classification dependent attribute value calculating unit 32 will be described with reference to FIG. 34.

In step 351, the counter I for sequential read of pieces of data in the parts attribute storage unit 6 is set to 0.

In step 352, an I-th piece of data in the parts attribute storage unit 6 is read.

In step 353, data coincident with the attribute kind in column 183 of the data piece I is retrieved from entries in the column 321 in the attribute classification storage unit 31 and extracted. For example, if the data is in line 186 of FIG. 18, then the attribute kind in column 183 is "chemical substance 2" and hence this substance is retrieved from entries in the column 321 in FIG. 31 to extract lines 326 and 329 in which "chemical substance 2" is entered. Namely, in this process, a chemical substance group corresponding to the chemical substance is extracted.

In step 354, the extracted data is multiplied by its conversion coefficient to calculate a regulation/report destination dependent substance group content amount and the calculated result is stored in the classification dependent attribute value storage unit 33. For a line 326 extracted in the step 353, the conversion coefficient in column 324 is 0.45 and the chemical substance content amount in column 324 is 4 mg from the entry in line 186 in FIG. 18, so that the content amount of the substance group "A2" corresponding to the regulation/report destination "OWN" is determined as being $$4 \text{ mg} * 0.45 = 1.8 \text{ mg}.$$

This result is stored in line 348 in FIG. 33. The content amount associated with substance group A2 of regulation/report destination "OWN" corresponding to a part of company number XX and parts number D1 is determined as being 1.8 mg.

Similarly, from the a line 329 extracted in the step 353, the content amount can be determined as in line 349 in FIG. 33.

In step 355, it is decided whether processing of all data pieces in the parts attribute storage unit 6 has ended. That is, this is to decide processing of data pieces in FIG. 18 as to whether to be completed. If completed, the program proceeds to step 357 but if not completed, to step 356. At the time that "yes" is issued from the step 355, data pieces of chemical substances of all parts described in the parts attribute storage unit 6 have been converted into content amounts in respect of individual entries of regulation/report destination and of substance group.

In the step 356, if processing of all data pieces in the parts attribute storage unit 6 has not been completed, the counter I for process data is advanced by 1. After increment, the program proceeds to the step 352 to repeat the succeeding steps.

In the step 357, by using as key the company number in column 341, parts number in column 342, regulations/report destination in column 343 and substance group in column 344, the content amounts of data pieces stored in the classification attribute value storage unit 33 and being coincident with entries of the key items are summed to collect or totalize the content amounts. In the substance group classification, a plurality of chemical substances are included and in the steps up to step 355, the conversion process is carried out in respect of the individual chemical substances, with the result that different chemical substances included in the same substance group are stored in the form of different data. The individual steps constitute the process for collecting or totalizing the content amounts in the same substance group.

Through the above process, the content amounts associated with individual entries of the regulation/report destination and substance group can be calculated and stored in respect of the individual parts. Although not detailed because of analogy, the content amounts associated with individual entries of the regulation/report destination shown in FIG. 36 can be calculated and stored in the classification dependent attribute value storage unit 33 in connection with substances corresponding to entries of the regulation/report destination item shown in FIG. 33.

In the parts attribute retrieval unit 7, by designating the substance group, for example, as an attribute allotted to a part and designating RoHS as the regulation/report destination, an attribute corresponding to "RoHS" of regulation/report destination can be extracted from FIG. 33, in which substance groups associated with entries of the regulation/report destination are stored, and the extracted attribute can be added to the part collected by the parts attribute totalization unit 8' and displayed.

An example of a screen realizable with the classification dependent attribute value storage unit 33 will now be explained. A first screen example is illustrated in FIG. 36. In this example in FIG. 36, "RoHS" is selected as the item of regulation/report destination for a parts bill and chemical substance content amounts classified pursuant to the "RoHS" are totalized, thus constituting part of the parts bill. In the figure, attributes concerning a part in the parts bill are indicated in columns 371 to 376 and information concerning chemical substances is indicated in columns 377 to 379. In the parts name in column 372, "_" preceding the name expresses the hierarchical order number.

In the parts bill, a representative part is indicated in line 37C. In connection therewith, a power source cord corresponding to correspondent code 22222 and correspondent parts number GG-50N5-024 in line 37G and a power source cord corresponding to correspondent code 10000 and correspondent parts number FF-50N5-024 in line 37N are a plurality of candidate parts. These plural candidate parts are can be known as being parts purchased from a plurality of different companies because the correspondent code (in column 373) of the upper hierarchical representative part in line 37C is blank with the correspondent codes entered in lower hierarchies in lines 37G and 37N, demonstrating that the part in the line 37C is a self company end representative part linked to the lower hierarchical plural different company purchase parts of the correspondents 22222 and 10000. In this example, the power supply cord in the line 37G is made of vinyl chloride resin in line 37J and copper wire in line 37L and the power supply cord in the line 37N is made of copper wire in line 37R and vinyl chloride resin in line 37u. In this structure, the vinyl chloride resin in line 37J indicated by the end of the parts bill is added with a chemical substance in line 37K, the copper wire in line 37L is added with a chemical substance in line 37M, the copper wire in line 37R is added with chemical substances in lines 37S and 37t and the vinyl chloride resin in line 37u is added with a chemical substance in line 37w. As a result, for the power supply cord of correspondent 22222 in the line 37G, the chemical substances added to the child vinyl chloride resin in line 37J and to the child copper wire in line 37L are collected or totalized in accordance with the number of parts, resulting in addition of 6320 mg of vinyl chloride monomer in line 37H and 60 mg of lead in line 37I.

Meanwhile, for the power supply cord of the correspondent code 10000 in the line 37N, 7920 mg of vinyl chloride monomer in line 37O, 50.000 mg of lead in line 37P and 0.050 mg of cadmium in line 37Q are collected or totalized.

For the power supply cord in the line 37C, one of chemical substances of child parts in lines 37G and 37N which has a large content amount is collected. In other words, for the vinyl chloride monomer in line 37D, values in the lines 37H and 37O are compared to adopt a larger value of 7920 mg in the line 37O, for the lead in line 37E, values in the lines 37I and 37P are compared to adopt a larger value in the line 37I and for cadmium in the line 37F, only one value in the line 37Q (not contained in the part of correspondent 22222) is adopted.

By adding attribute values of arbitrary regulation/report destination to parts and collecting, attribute values in classification of substance group and substance included in the regulation/report destination can be totalized and displayed in parallel in the parts bill. In the example of FIG. 36, the content amounts of the respective chemical substances of the plural company purchase parts can be made clear and by comparing the attribute value collected for the representative parts with the attribute values of plural company purchase parts, it is possible to clarify which chemical substance amount of which part is adopted and collected.

The above example has been explained by way of the chemical substance but with the regulation/report destination dependent substance group stored in FIG. 33, totalization can be executed in a similar way.

In an alternative display method, a part containing a specified chemical substance or substance group can also be displayed distinctively in a display of a parts bill display screen. A user interface for enabling the user to select a substance/substance group for which the presence or absence is desired to be decided in advance is prepared and a part containing the chemical substance/substance group selected by the user can be displayed in distinctive color. For example, it is presumed that in FIG. 36, the user selects "cadmium" as a chemical substance for which the content decision is desired to be executed. Then, an item of "content flag" is added to the totalization result storage unit (275, 275') in course of the parts attribute retrieval process or parts attribute totalization process in FIG. 17 or 30 and for a part added with an attribute of "cadmium" or a child part added with "cadmium" during attribute totalization, the "content flag" is set to "1". In displaying the totalization result, for the part for which the "content flag" is "1", distinctive color display is carried out as designated by 37X, 37Y and 37Z to permit the part to be discriminated from another part.

An example of a second output screen is illustrated in FIG. 37. In the second output screen example, the content amounts of substances or substance groups required to be administered by the regulation/report destination are indicated in parallel in respect of individual parts in a parts bill. In the attribute classification storage unit in FIG. 31, all chemical substances/substance groups to be administrated in respect of individual regulations/report destinations are listed up. Then, the regulations/report destinations are designated and chemical substance/substance group contained in correspondence to the individual regulations/report destinations are arrayed in abscissa to indicate content amounts of individual chemical substances/substance groups in respect of individual parts. As shown in FIGS. 33 and 35, the content amounts of individual chemical substances/substance groups are stored in respect of individual parts in the classification dependent attribute value storage unit 33 of FIG. 30. The user is permitted to select regulation/report destination and chemical substance/substance group desired for display. Then, data of selected regulation/report destination and chemical substance/substance group are extracted from the classification dependent attribute storage unit 33 (FIGS. 34 and 36) and the part and chemical substance/substance group are displayed in array in ordinate and abscissa, respectively. An example of display where "RoHS" is selected as regulation/report destination and "substance group" is selected as chemical substance/substance group is shown in FIG. 37. Indicated in column 381 is information of parts number, correspondent code and correspondent parts number for identifying parts and indicated in columns 382 to 389 are content amounts of substance group corresponding to the information. The content amounts of chemical substance/substance group of parts are stored in the classification dependent value storage unit 33 but when having a knowledge of masses of parts, content percentage of the part mass can be calculated and indicated in array as shown in columns 383, 385 and 389. Further, a chemical substance not contained in the corresponding part as indicated in line 38A in the column 388 is to be blank in the classification dependent attribute value storage unit of FIG. 30 and in such a case, the value is set to 0 for indication. In addition, by providing the sorting function in respect of the individual columns to ensure that parts can be rearranged in order of larger values, a part of a larger content amount, for example, "lead and its compound" in the column 382 can be searched easily.

In the screen example of FIG. 37, a list of end parts is indicated by being added with attributes but as in the example of FIG. 36, a parts tree is indicated by being added with attributes, making it effective to confirm which part actually has what content amount.

The indication of FIG. 37 features that the content amounts of chemical substance/substance group corresponding to the regulation/report destination can all be arrayed and seen to make it effective to confirm how the content amounts of the chemical substance/substance group administrated pursuant to a specified regulation are related to different parts.

In the display example of FIG. 37, the content amounts of all parts in array can be seen but in an alternate realization method, a threshold value of content amount/content percentage in unit of part admitted for inclusion by a regulation may be kept in custody as data or inputted by the user and by comparing the threshold value with the content amount of each part, only a part in excess of the threshold value can be filtered for display. According to this display method, parts violating the regulation can be extracted and displayed automatically.

5. Embodiment 5

In a fifth embodiment, when parts or materials are adopted as elements of a parts bill, the mass is collected in respect of individual kinds of materials and displayed. This embodiment presupposes an instance in which, for example, when collecting organic substances contained in a product, a chemical substance contained in a part must be investigated by tracing it back up to its supply chain. In such an instance, a material maker A of the material contained in the part must sometimes conduct investigation by further tracing the material back up to a material maker B of the material. In this case, the material by the material maker A is deemed as a parent material and the material by the material maker B is deemed as a child material and they are taken as constituent elements of a parts bill, thus making the handling job easy. But if the material is handled as an attribute of a part as usual, collection of the materials cannot be done in respect of the kinds of materials. In the present embodiment, when the materials are handled as constituent elements of a parts bill, collection of the materials according to the individual kinds of materials can be assured.

Figure 38:
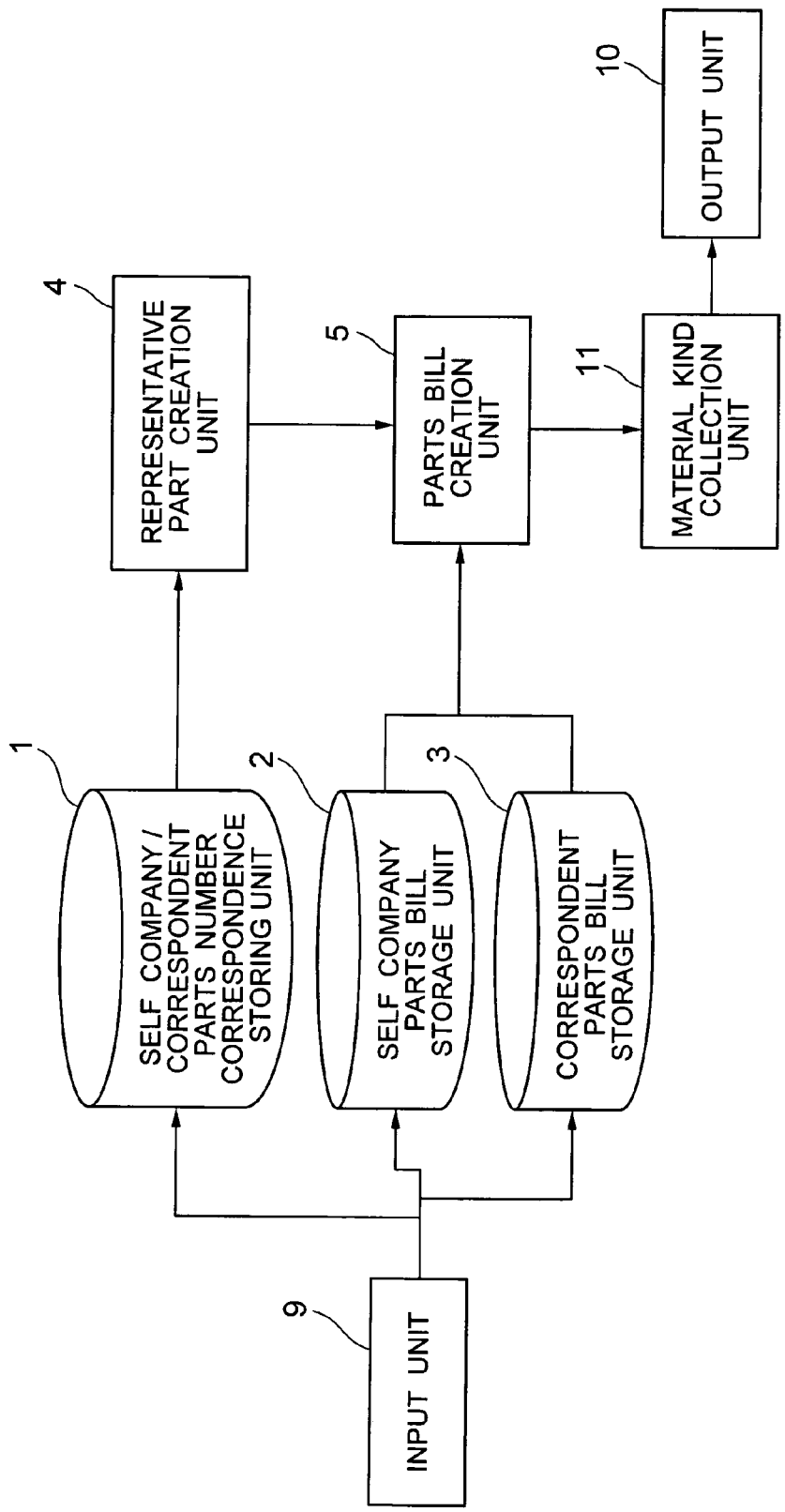
FIG. 38 is a block diagram showing the construction of a fifth embodiment of the design/manufacture support system according to the invention.

The construction of the fifth embodiment is illustrated in FIG. 38. A newly added component is a material kind collection unit 11.

The material kind collection unit 11 is for performing collection according to individual kinds of materials when the material is also handled as a constituent element of a parts bill. The material kind collection unit 11 will be described with reference to FIGS. 39 and 40.

Figures 39, 40:
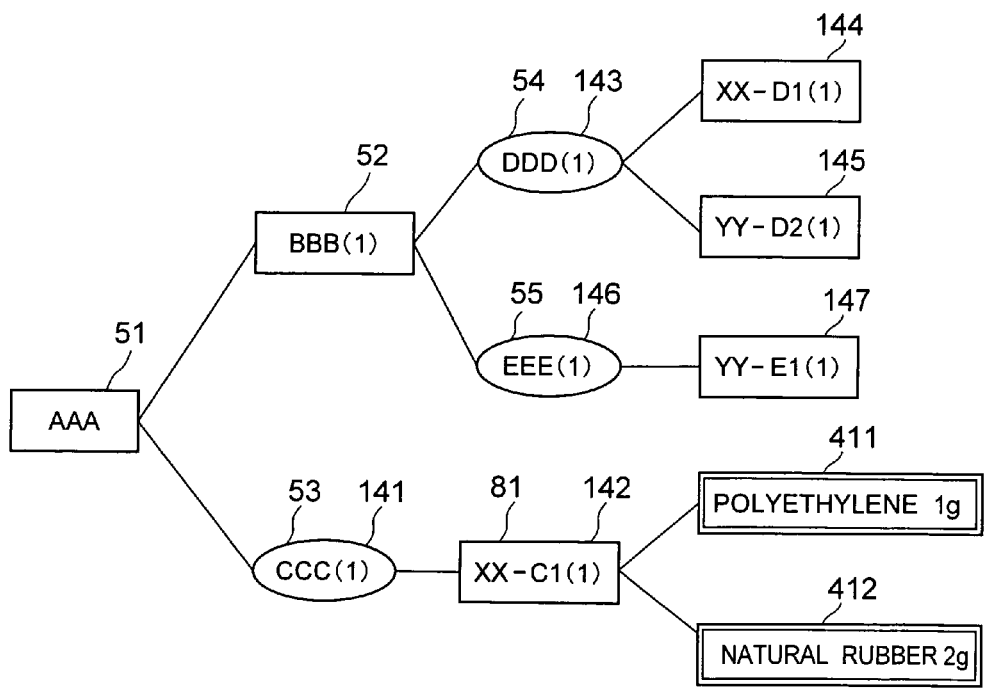
FIG. 39 is a table for explaining an example of PN data of the correspondent parts bill storage unit when materials are also handled as constituents of the parts bill.
FIG. 40 is a diagram showing an example of output of the parts bill as a result of totalization by a material kind totalization unit.

Illustrated in FIG. 39 is an example of PN data in the correspondent parts bill storage unit 3 when the material is also handled as a constituent of a parts bill (corresponding to FIG. 6 in embodiment 1). In this example, the material is indicated in association with parts number G1 in line 407 and parts number H1 in line 408. Here, when the material is also handled as a constituent element of the parts bill, for discrimination between parts and material, an attribute "parts material sort" is provided in attribute column (column 404). Further, for collection of the kind of material, columns "mass" (column 405) and "material kind" (column 406) are similarly provided in the attribute column. In inputting data into the input unit 9 of FIG. 38, when a material is inputted to the PN data, the "part material sort" in column 404 is set to "material" and information of the material which is itemized as mass in column 405 and material kind in column 406 is inputted. In the case of this example, G1 in the line 407 contains "1 g" of "polyethylene" and H1 in the line 408 contains "2 g" of "natural rubber".

When "material" is entered in the parts material sort in the column 404, the material kind collection unit 11 carries out a process in which the material is not outputted as the constituent element of the parts bill but is treated as an attribute of parent part which in turn is added with a material kind and outputted through the output unit 10.

An example of output of the parts bill delivered as a result of collection by the material kind collection unit 11 is illustrated in FIG. 40. The output example of the parts bill when the collection by the material kind collection unit 11 is not executed is shown in FIG. 16, in which XX-G1 in the node 82 and XX-H1 in the node 83 are delivered as constituent elements of the parts bill. Contrary to this, in the output as a result of the collection by the material kind collection unit 11, material XX-G1 is not a child part of the parent part XX-C1 (in the node 81 or 142) but is added as a material classification attribute of polyethylene 1 g. Further, the material XX-H1 is not a child part of the parent part XX-C1 (in the node 81 or 142), either but is added as a material classification attribute of natural rubber 2g. Since the material classification attribute can be handled as the attribute value of the parts described in connection with embodiment 2 to embodiment 4, the attribute of the product can be totalized by using the parts bill or the material kind according to each regulations/report destination can be displayed by using the attribute classification.

In this manner, by providing "parts material sort", "material kind" and "mass" as the PN attribute of a part, the material can be displayed as a constituent element of the parts bill or as the material classification attribute of a parent part.

Referring to FIG. 41, an example of screen of the result of the collection by the material kind collection unit is depicted. In the figure, parts constituting a parts bill and attributes of the parts are indicated in columns.421 to 425. For a tube in line 428, polyethylene in line 429, which is a child part of the tube in the line 428 in the case of PN data, is displayed as a material kind. Similarly, lead plated steel in line 42B and PS (polyethylene) in line 42D, which are also parts on the PN data, are identified as materials by means of the material kind collection unit and collected as material kinds and displayed as attributes of a parent part.

Further, in the present invention, the parts bill in which the material on the PN data is totalized as the material can be added with the attribute such as chemical substance/substance group to execute complex collection of the material and the chemical substance/substance group. When "RoHS" is selected as the regulation/report destination in FIG. 36 and the chemical substance content amount classified pursuant to the "RoHS" is collected, the material collection is added to assure complex collection, the result of which is exemplified in FIG. 42. Taking "vinyl chloride resin" in line 37J in FIG. 36, for instance, this is indicated in "parts name" in column 372 representing a constituent element of the parts bill in the case of FIG. 36 devoid of the material kind collection whereas in FIG. 42, the "vinyl chloride resin" is indicated as the material kind attribute in line 43J in association with the item "material" in column 437. Also, the chemical substance amount contained in the "vinyl chloride resin" in the line 43J is indicated in line 43K. In addition, in the example of FIG. 36, for the power supply cord in line 37C, the mass of material kind cannot be totalized but with the material kind added as the attribute, the material kind can also be totalized for the upper hierarchical part in line 43C as indicated in line 43D.

The fifth embodiment for performing collection in respect of individual material kinds when the material is handled as the constituent element of the parts bill has been set forth so far.

The present invention can also be materialized by permitting a computer to function on a program as the means explained in connection with the foregoing embodiments.

The invention claimed is:

1. A design/manufacture support system comprising:
   a self company/correspondent parts number correspondence storing unit for storing a correspondence between parts numbers of a self company part and a correspondent part;
   a self company parts bill storage unit for storing a structure of parts of a self company product;
   a correspondent parts bill storage unit for storing a structure of parts to be purchased from a correspondent;
   a representative part creation unit for creating, from the correspondence between parts numbers of a self company part and a correspondent part, a representative part node of self company parts corresponding to a plurality of correspondent parts candidates;
   a parts bill creation unit for creating a parts bill of a product from: the representative part node created by said representative part creation unit, a self company parts bill stored in said self company parts bill storage unit, and a correspondent parts bill stored in said correspondent parts bill storage unit;
   an input unit for inputting data to said self company/correspondent parts number correspondence storing unit, self company parts bill storage unit and correspondent parts bill storage unit; and
   an output unit for displaying the parts bill of the product created by said parts bill creation unit in a tree form diagram, the parts bill showing hierarchy relations between the parts including the representative part node in tree form and showing the relations between the representative part node and all correspondent parts candidates in tree form.

2. A design/manufacture support system according to claim 1, wherein when displaying the parts bill created by said parts bill creation unit, the representative part node is displayed in a graphic figure different from graphic figures for other parts for distinguishing the representative part node from other parts.

3. A design/manufacture support system according to claim 1, wherein when displaying the parts bill created by said parts bill creation unit, the hierarchy of the part of correspondent is not displayed.

4. A design/manufacture support system according to claim 1, wherein as an element constituting the parts bill, a part or a material is adopted.

5. A design/manufacture support system comprising:
   a self company/correspondent part number correspondence storing unit for storing a correspondence between parts numbers of a self company part and a correspondent part;
   a self company parts bill storage unit for storing a structure of parts of a self company product;
   a correspondent parts bill storage unit for storing a structure of parts purchased from a correspondent;
   a part attribute storage unit for storing at least one attribute value of each part;
   a representative part creation unit for creating, when a plurality of candidates for a correspondent part corresponding to said self company part exist, a representative node corresponding to said plural parts candidates extracted from the correspondence between self company and correspondent parts numbers stored in said self company/correspondent parts number correspondence storing unit;
   a parts bill creation unit for creating a parts bill of a product from: the created representative part node, the self company parts bill stored in said self company parts bill storage unit and the correspondent parts bill stored in said correspondent part number storage unit;
   a part attribute retrieval unit for retrieving the attribute value added to each part constituting the parts bill created by said parts bill creation unit;
   a product attribute totalization unit for totalizing an attribute value of the product from the parts bill created by said parts bill creation unit and the attribute value of a part retrieved by said part attribute retrieval unit, the attribute value of the representative node being determined from the attribute values of the parts candidates by a predetermined scheme;
   an input unit for inputting data to said self company/correspondent parts number correspondence storing unit, self parts bill storage unit and correspondent parts bill storage unit; and
   an output unit for displaying the parts bill of the product created by said parts bill creation unit in a tree form diagram, the parts bill showing hierarchy relations between the parts including the representative node in tree form and showing the relations between the representative part node and all correspondent parts candidates in tree form with the result of totalization by said product attribute totalization unit.

6. A design/manufacture support system according to claim 5, wherein the attribute values of all respective parts candidates are displayed.

7. A design/manufacture support system according to claim 5, wherein, when one of said plural candidates of the representative part node is selected, the mass of a chemical substance contained in said product in case that the one of said plural candidates is selected is displayed with the parts bill.

8. A design/manufacture support system according to claim 5, wherein in displaying the attribute value of said representative part node, the attribute value of said representative part node is determined from attribute values of the parts candidates of said representative part node.

9. A design/manufacture support system according to claim 8, wherein the attribute value of said representative part node is set to one of a maximum value, a minimum value and an average value of attribute values of the parts candidates depending on a predetermined scheme.

10. A design/manufacture support system according to claim 5, wherein the attribute value stored by said part attribute storage unit is a chemical substance content amount.

11. A design/manufacture support system according to claim 10, wherein the attribute totalized by said product attribute totalization unit is a chemical substance content amount of the product.

12. A design/manufacture support system comprising:
    a self company/correspondent part number correspondence storing unit for storing a correspondence between parts numbers of a self company part and a correspondence part;
    a self company parts bill storage unit for storing a structure of parts of a self company product;

a correspondent parts bill storage unit for storing a structure of parts purchased from a correspondent;

a parts bill creation unit for creating a parts bill of a product from: the correspondence between a self company part number and a correspondent part number stored in said self company/correspondent parts number correspondence storing unit;

a part attribute storage unit for storing an attribute of each part;

a part attribute retrieval unit for retrieving an attribute added to each part constituting the parts bill created by said parts bill creation unit;

a product attribute totalization unit for totalizing an attribute of a product from the parts bill created by said parts bill creation unit and the attribute of a part retrieved by said part attribute retrieval unit;

an input unit for inputting data to said self company/correspondent parts number correspondence storing unit, self parts bill storage unit and correspondent parts bill storage unit;

an output unit for delivering the parts bill created by said parts bill creation unit and the result of totalization by said product attribute totalization unit;

an attribute classification storage unit for storing classification of attributes;

an attribute classification dependent attribute value calculating unit for calculating an attribute classification dependent attribute value of each part from the attribute classification stored in said attribute classification storage unit and a part attribute stored in a part attribute storage unit; and a classification dependent attribute value storage unit for storing the attribute classification dependent attribute value calculated by said attribute classification dependent attribute value calculating unit, wherein a part attribute retrieval unit retrieves a part attribute from the classification dependent attribute value stored in said classification dependent attribute value storing unit and adds the retrieved part attribute to a part.

13. A design/manufacture support system according to claim 12, wherein the attribute classification is a chemical substance or a substance group administrated in accordance with a regulation or report destination.

14. A design/manufacture support system according to claim 13, wherein said output unit arrays and displays, in a parts bill, the chemical substance or substance group administrated in accordance with a regulation or report destination.

15. A design/manufacture support system according to claim 12, wherein said output unit displays, on a parts bill, parts in excess of substance content amounts for individual parts authorized by a regulation.

16. A design/manufacture support system according to claim 12, further comprising a material kind totalization unit for converting, when the constituent element of the parts bill is a material, the material into an attribute of a parent part and collecting the mass in respect of individual kinds of materials.

17. A design/manufacture support system according to claim 16, wherein an attribute of a chemical substance or substance group is added to the parts bill and the material kind and the chemical substance or the substance group are totalized.

18. A design/manufacture support system comprising:

a self company/correspondent parts number correspondence storing unit for storing a correspondence between parts numbers of a self company part and a correspondent part, at least some correspondent parts forming a hierarchically structure;

a self company parts bill storage unit for storing a structure of parts of a self company product;

a parts attribute storage unit for storing at least one attribute value of predetermined parts;

a correspondent parts bill storage unit for storing a structure of parts to be purchased from a correspondent;

a representative part creation unit for creating, from the correspondence between parts numbers of a self company part and a correspondent part, a representative part node of self company parts corresponding to a plurality of correspondent parts candidates;

a parts bill creation unit for creating a parts bill of a product from: the representative part node created by said representative part creation unit, a self company parts bill stored in said self company parts bill storage unit, a correspondent parts bill stored in said correspondent parts bill storage unit;

a parts attribute totalization unit for totalizing the attribute values of all parts forming the product by retrieving the created part bill and the parts attribute storage unit;

an input unit for inputting data to said self company/correspondent parts number correspondence storing unit, self company parts bill storage unit and correspondent parts bill storage unit; and an output unit for delivering the parts bill of the product created by said parts bill creation unit, wherein, when the parts attribute totalization unit checks the parts attribute storage unit and finds no attribute is set for the parts, the parts attribute totalization unit retrieves lower level parts of the hierarchical structure to totalize the parts attribute value.

19. A design/manufacture support method comprising:

storing a correspondence between parts numbers of a self company part and a correspondent part in a self company/correspondent parts number correspondence storing unit;

storing a structure of parts of a self company product in a self company parts bill storage unit;

storing a structure of parts to be purchased from a correspondent in a correspondent parts bill storage unit;

creating, from the correspondence between parts numbers of a self company part and a correspondent part, a representative part node of self company parts corresponding to a plurality of correspondent parts candidates;

creating a parts bill of a product from: the representative part node, a self company parts bill stored in the self company parts bill storage unit, and a correspondent parts bill stored in the correspondent parts bill storage unit;

inputting data to said self company/correspondent parts number correspondence storing unit, self company parts bill storage unit and correspondent parts bill storage unit; and displaying the parts bill of the product created by said parts bill creation unit in a tree form diagram via an output unit, the parts bill showing hierarchy relations between the parts including the representative part node in tree form and showing the relations between the representative part node and all correspondent parts candidates in tree form.

20. A computer-readable medium having a stored design/manufacture support program, the program, when implemented, effecting operations of:

storing the correspondence between parts numbers of a self company part and a correspondent part in a self company/correspondent parts number correspondence storing unit;

storing a structure of parts of a self company product in a self company parts bill storage unit;

storing a structure of parts to be purchased from a correspondent in a correspondent parts bill storage unit;

creating, from the correspondence between parts numbers of a self company part and a correspondent part, a representative part node of self company parts corresponding to a plurality of correspondent parts candidates;

creating a parts bill of a product from: the representative part node, a self company parts bill stored in the self company parts bill storage unit, and a correspondent parts bill stored in the correspondent parts bill storage unit;

inputting data to said self company/correspondent parts number correspondence storing unit, self company parts bill storage unit and correspondent parts bill storage unit; and displaying the parts bill of the product created by said parts bill creation unit in a tree form diagram via an output unit, the parts bill showing hierarchy relations between the parts including the representative part node in tree form and showing the relations between the representative part node and all correspondent parts candidates in tree form.

21. A design/manufacture support method comprising:

storing a correspondence between parts numbers of a self company part and a correspondent part, in a self company/correspondent part number correspondence storing unit;

storing a structure of parts of a self company product in a self company parts bill storage unit;

storing a structure of parts purchased from a correspondent in a correspondent parts bill storage unit;

storing at least one attribute value of each part in a part attribute storage unit;

creating, in a representative part creation unit, when a plurality of candidates for a correspondent part corresponding to said self company part exist, a representative node corresponding to said plural parts candidates extracted from the correspondence between self company and correspondent parts numbers stored in said self company/correspondent parts number correspondence storing unit;

creating, via a parts bill creation unit, a parts bill of a product from: the created representative part node, the self company parts bill stored in said self company parts bill storage unit and the correspondent parts bill stored in said correspondent part number storage unit;

retrieving, using a part attribute retrieval unit, the attribute value added to each part constituting the parts bill created by said parts bill creation unit; p1 totalizing an attribute value of the product from the parts bill created by said parts bill creation unit and the attribute value of a part retrieved by said part attribute retrieval unit, the attribute value of the representative node being determined from the attribute values of the parts candidates by a predetermined scheme;

inputting data to said self company/correspondent parts number correspondence storing unit, self parts bill storage unit and correspondent parts bill storage unit; and displaying the parts bill of the product created by said parts bill creation unit in a tree form diagram, the parts bill showing hierarchy relations between the parts including the representative node in tree form and showing the relations between the representative part node and all correspondent parts candidates in tree form with the result of totalizing.

22. A design/manufacture support method comprising:

storing a correspondence between parts numbers of a self company part and a correspondence part in a self company/correspondent part number correspondence storing unit;

storing a structure of parts of a self company product in a self company parts bill storage unit;

storing a structure of parts purchased from a correspondent in a correspondent parts bill storage unit;

creating, in a parts bill creation unit, a parts bill of a product from: the correspondence between a self company part number and a correspondent part number stored in said self company/correspondent parts number correspondence storing unit;

storing an attribute of each part in a part attribute storage unit;

retrieving, via a part attribute retrieval unit, an attribute added to each part constituting the parts bill created by said parts bill creation unit;

totalizing, via a product attribute totalization unit, an attribute of a product from the parts bill created by said parts bill creation unit and the attribute of a part retrieved by said part attribute retrieval unit;

inputting data to said self company/correspondent parts number correspondence storing unit, self parts bill storage unit and correspondent parts bill storage unit;

delivering the parts bill created by said parts bill creation unit and the result of totalization by said product attribute totalization unit;

storing, in an attribute classification storage unit, a classification of attributes;

calculating, via an attribute classification dependent attribute value calculating unit, an attribute classification dependent attribute value of each part from the attribute classification stored in said attribute classification storage unit and a part attribute stored in a part attribute storage unit; and storing, in a classification dependent attribute value storage unit, the attribute classification dependent attribute value calculated by said attribute classification dependent attribute value calculating unit, retrieving, via a part attribute retrieval unit, a part attribute from the classification dependent attribute value stored in said classification dependent attribute value storing unit and adding the retrieved part attribute to a part.

23. A design/manufacture support method comprising:

storing a correspondence between parts numbers of a self company part and a correspondent part, at least some correspondent parts forming a hierarchically structure, in a self company/correspondent parts number correspondence storing unit;

storing a structure of parts of a self company product in a self company parts bill storage unit;

storing at least one attribute value of predetermined parts in a parts attribute storage unit;

storing a structure of parts to be purchased from a correspondent in a correspondent parts bill storage unit;

creating, from the correspondence between parts numbers of a self company part and a correspondent part, a representative part node of self company parts corresponding to a plurality of correspondent parts candidates, using a representative part creation unit;

creating, via a parts bill creation unit, a parts bill of a product from: the representative part node created by said representative part creation unit, a self company parts bill stored in said self company parts bill storage unit, a correspondent parts bill stored in said correspondent parts bill storage unit;

totalizing, via a parts attribute totalization unit, the attribute values of all parts forming the product by retrieving the created part bill and the parts attribute storage unit;

inputting data to said self company/correspondent parts number correspondence storing unit, self company parts bill storage unit and correspondent parts bill storage unit; and delivering the parts bill of the product created by said parts bill creation unit via an output unit, wherein, when the parts attribute totalization unit checks the parts attribute storage unit and finds no attribute is set for the parts, the parts attribute totalization unit retrieves lower level parts of the hierarchical structure in totalizing the parts attribute value.

* * * * *